(12) United States Patent
Tae

(10) Patent No.: US 10,940,887 B2
(45) Date of Patent: Mar. 9, 2021

(54) VEHICLE CONTROL APPARATUS AND CONTROL METHOD THEREOF

(71) Applicant: MANDO CORPORATION, Gyeonggi-do (KR)

(72) Inventor: Hyun Chul Tae, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 402 days.

(21) Appl. No.: 15/963,086

(22) Filed: Apr. 25, 2018

(65) Prior Publication Data

US 2018/0312195 A1 Nov. 1, 2018

(30) Foreign Application Priority Data

Apr. 28, 2017 (KR) .................. 10-2017-0055219

(51) Int. Cl.
*B62D 6/00* (2006.01)
*B62D 13/00* (2006.01)
(Continued)

(52) U.S. Cl.
CPC .......... *B62D 13/005* (2013.01); *B60D 1/62* (2013.01); *B60W 30/02* (2013.01);
(Continued)

(58) Field of Classification Search
CPC ................................................. B62D 13/005
See application file for complete search history.

(56) References Cited

U.S. PATENT DOCUMENTS 6,523,911 B1 * 2/2003 Rupp .................. B60T 7/20
188/112 A
7,272,481 B2 * 9/2007 Einig ................... B60T 8/1708
303/146

(Continued)

FOREIGN PATENT DOCUMENTS

JP  2001-206211  7/2001
JP  2006-507183  3/2006
(Continued)

OTHER PUBLICATIONS

Office Action dated Mar. 20, 2019 for Korean Patent Application No. 10-2017-0055219 and its English machine translation by Global Dossier.

(Continued)

*Primary Examiner* — Jonathan M Dager
(74) *Attorney, Agent, or Firm* — Ladas & Parry, LLP

(57) ABSTRACT

A vehicle control apparatus and method include: a sensor sensing current trailer connection information, current trailer load information, current trailer traction information, and current trailer relative angle information; a determination unit determining whether a trailer is in a mounted state by using the sensed current trailer connection information, and determining whether an ESC is in an unstable operation state by using the sensed current trailer load information, current trailer traction information, and current trailer relative angle information when the trailer is in the mounted state; and a control unit transmitting a compensation signal to an ESC apparatus to compensate the ESC apparatus in accordance with the set target ESC stable operation control information to operate the ESC apparatus in a stable operation state according to the sensed current trailer load information, current trailer traction information, and current trailer rela- (Continued)

tive angle information when the ESC is in the unstable operation state.

18 Claims, 21 Drawing Sheets

(51) Int. Cl.
    *B60D 1/62*     (2006.01)
    *B62D 15/02*     (2006.01)
    *B60W 30/02*     (2012.01)
    *B60W 30/045*     (2012.01)

(52) U.S. Cl.
    CPC ........... *B60W 30/045* (2013.01); *B62D 6/003* (2013.01); *B62D 15/021* (2013.01)

(56) References Cited

U.S. PATENT DOCUMENTS

| | | | |
|---|---|---|---|
| 8,060,288 B2* | 11/2011 | Choby | F16H 61/16 701/70 |
| 8,311,693 B2* | 11/2012 | Wu | B60T 8/17555 701/22 |
| 9,026,311 B1* | 5/2015 | Pieronek | B60W 10/18 701/48 |
| 9,340,228 B2* | 5/2016 | Xu | B62D 13/06 |
| 9,513,103 B2* | 12/2016 | Crossman | B62D 15/027 |
| 9,566,911 B2* | 2/2017 | Greenwood | G06T 7/20 |
| 9,908,377 B2* | 3/2018 | Allcorn | B60T 8/1708 |
| 9,956,965 B1* | 5/2018 | Hall | B60W 50/14 |
| 9,963,004 B2* | 5/2018 | Lavoie | B60D 1/30 |
| 10,005,492 B2* | 6/2018 | Raad | B62D 13/06 |
| 10,065,676 B2* | 9/2018 | Bradley | B60R 1/00 |
| 10,155,478 B2* | 12/2018 | Hu | B60R 1/00 |
| 10,196,088 B2* | 2/2019 | Lavoie | G06K 9/3216 |
| 2004/0021291 A1* | 2/2004 | Haug | B60T 8/1708 280/455.1 |
| 2004/0232652 A1* | 11/2004 | Namuduri | B60D 1/322 280/455.1 |
| 2005/0206224 A1* | 9/2005 | Lu | B60T 7/12 303/7 |
| 2005/0206229 A1* | 9/2005 | Lu | B60T 7/20 303/123 |
| 2005/0206231 A1* | 9/2005 | Lu | B60G 17/0162 303/146 |
| 2005/0206234 A1* | 9/2005 | Tseng | B60G 17/0162 303/146 |
| 2005/0206235 A1* | 9/2005 | Tseng | B60T 8/1837 303/146 |
| 2005/0236894 A1* | 10/2005 | Lu | B60W 10/20 303/139 |
| 2006/0125313 A1* | 6/2006 | Gunne | B60T 8/248 303/7 |
| 2006/0204347 A1* | 9/2006 | Waldbauer | B60T 7/20 410/156 |
| 2006/0206253 A1* | 9/2006 | Yu | B62D 6/002 701/70 |
| 2006/0229782 A1* | 10/2006 | Deng | B62D 6/003 701/42 |
| 2006/0235589 A1* | 10/2006 | Deng | B62D 13/00 701/41 |
| 2007/0260385 A1* | 11/2007 | Tandy, Jr. | B60T 8/246 701/70 |
| 2007/0260386 A1* | 11/2007 | Tandy, Jr. | B60T 8/1755 701/70 |
| 2008/0036296 A1* | 2/2008 | Wu | B60W 50/06 303/146 |
| 2008/0172163 A1* | 7/2008 | Englert | B60T 8/1708 701/83 |
| 2008/0177454 A1* | 7/2008 | Bond | B60T 8/1708 701/70 |
| 2008/0309156 A1* | 12/2008 | Kissel | B60T 13/746 303/20 |
| 2009/0005946 A1* | 1/2009 | Futamura | B60T 8/1708 701/70 |
| 2009/0093928 A1* | 4/2009 | Getman | B60T 8/1708 701/37 |
| 2009/0105906 A1* | 4/2009 | Hackney | B60W 30/02 701/38 |
| 2009/0198425 A1* | 8/2009 | Englert | B60D 1/30 701/70 |
| 2009/0210112 A1* | 8/2009 | Waldbauer | B60T 8/1755 701/42 |
| 2009/0219148 A1* | 9/2009 | Thomas | B60R 16/0315 340/431 |
| 2009/0228182 A1* | 9/2009 | Waldbauer | B62D 13/00 701/70 |
| 2009/0306861 A1* | 12/2009 | Schumann | B60W 40/12 701/48 |
| 2010/0152989 A1* | 6/2010 | Smith | B60T 7/085 701/78 |
| 2010/0332049 A1* | 12/2010 | Sy | B60T 8/1708 701/1 |
| 2011/0029210 A1* | 2/2011 | Wu | B60D 1/58 701/70 |
| 2011/0032484 A1* | 2/2011 | Seal | G03B 21/30 353/13 |
| 2011/0202238 A1* | 8/2011 | Cebon | B62D 13/04 701/41 |
| 2012/0024081 A1* | 2/2012 | Baker | G01L 5/136 73/862.338 |
| 2013/0038436 A1* | 2/2013 | Brey | B60T 7/20 340/431 |
| 2013/0253814 A1* | 9/2013 | Wirthlin | G01L 11/025 701/124 |
| 2014/0110918 A1* | 4/2014 | McCoy | B60D 1/248 280/511 |
| 2014/0267688 A1* | 9/2014 | Aich | B60W 50/0097 348/113 |
| 2014/0327229 A1* | 11/2014 | Scharf | G01G 19/12 280/511 |
| 2015/0165850 A1* | 6/2015 | Chiu | B60D 1/62 701/41 |
| 2015/0306929 A1* | 10/2015 | McAllister | G01G 19/02 177/136 |
| 2016/0231165 A1* | 8/2016 | Fredrickson | B60D 1/06 |
| 2016/0236526 A1* | 8/2016 | Shepard | B60D 1/36 |
| 2017/0106865 A1* | 4/2017 | Lavoie | B62D 15/027 |
| 2017/0129403 A1* | 5/2017 | Lavoie | B62D 15/027 |
| 2017/0177949 A1* | 6/2017 | Hu | G06T 7/12 |
| 2017/0305436 A1* | 10/2017 | Maskell | B60W 30/02 |
| 2019/0092388 A1* | 3/2019 | Raad | B62D 15/024 |
| 2019/0118858 A1* | 4/2019 | Flores De Jesus | B62D 15/025 |
| 2020/0156624 A1* | 5/2020 | Witte | B60W 30/02 |

FOREIGN PATENT DOCUMENTS

| | | |
|---|---|---|
| JP | 2010-167815 | 8/2010 |
| KR | 10-2004-0042599 | 5/2004 |
| KR | 10-2015-0117828 | 10/2015 |
| KR | 10-1595348 | 2/2016 |
| KR | 10-2016-0139457 | 12/2016 |

OTHER PUBLICATIONS

Office Action dated Oct. 4, 2018 for Korean Patent Application No. 10-2017-0055219 and its English machine translation by Global Dossier.

* cited by examiner

VEHICLE CONTROL APPARATUS AND CONTROL METHOD THEREOF

CROSS-REFERENCE TO RELATED APPLICATION(S)

This application is based on and claims priority under 35 U.S.C. § 119 to Korean Patent Application No. 10-2017-0055219, filed on Apr. 28, 2017 in the Korean Intellectual Property Office, the disclosure of which is incorporated by reference herein in its entirety.

BACKGROUND

1. Technical Field

The present disclosure relates to a vehicle control apparatus and a control method thereof.

2. Description of the Related Art

Generally, a conventional trailer is a vehicle without power that carries a load or a person by connecting to a towing vehicle.

As an example, as described in Korean Patent Publication No. 10-2004-0042599 (published on May 20, 2004), an automatic hitch ball device for a conventional trailer capable of more precisely controlling a rotation angle of a latching bar with respect to the rotation of a motor operated by the control of a controller has been disclosed.

However, the automatic hitch ball device of the conventional trailer has a limitation in stably operating an ESC apparatus when the trailer is connected, and has a limitation in stabilizing the behavior of the trailer while stably operating the EPS apparatus in connecting the trailer.

SUMMARY

An aspect of the present disclosure is to provide a vehicle control apparatus and a control method thereof capable of stably operating an ESC apparatus when a trailer is connected.

An aspect of the present disclosure is to provide a vehicle control apparatus and a control method thereof capable of stabilizing the behavior of a trailer while stably operating an EPS apparatus when a trailer is connected.

An aspect of the present disclosure is to provide a vehicle control apparatus and a control method thereof capable of suppressing anxiety about a current operating state of an ESC apparatus to improve the reliability of the apparatus.

An aspect of the present disclosure is to provide a vehicle control apparatus and a control method thereof capable of suppressing anxiety about a current state of a trailer to improve the reliability of the apparatus.

Additional aspects of the present disclosure will be set forth in part in the description which follows and, in part, will be obvious from the description, or may be learned by practice of the disclosure.

In accordance with one aspect of the present disclosure, there may be provided a vehicle control apparatus including: a sensing unit that senses at least one of current trailer connection information, current trailer load information, current trailer traction information, and current trailer relative angle information; a determination unit that determines whether a trailer is in a mounted state by using the sensed current trailer connection information, and determines whether an ESC (Electronic Stability Control) is in an unstable operation state by using at least one of the sensed current trailer load information, current trailer traction information, and current trailer relative angle information when the trailer is in the mounted state; and a control unit that transmits a first compensation signal to an ESC apparatus to compensate the ESC apparatus in accordance with the set target ESC stable operation control information in order to operate the ESC apparatus in a stable operation state according to at least one of the sensed current trailer load information, current trailer traction information, and current trailer relative angle information when the ESC is in the unstable operation state.

In accordance with another aspect of the present disclosure, the sensing unit may further sense at least one of current vehicle speed information, current wheel speed information, current steering angle information, and current YAW/G information when the trailer is in the mounted state; the determination unit may further determine whether the ESC is in an unstable operation state by further using at least one of the sensed current vehicle speed information, current wheel speed information, current steering angle information, and current YAW/G information; and the control unit may further transmit the first compensation signal to the ESC apparatus to compensate the ESC apparatus in accordance with the set target ESC stable operation control information in order to operate the ESC apparatus in a stable operation state according to at least one of the sensed current vehicle speed information, current wheel speed information, current steering angle information, current YAW/G information, current trailer connection information, current trailer load information, current trailer traction information, and current trailer relative angle information when the ESC is in the unstable operation state.

In accordance with another aspect of the present disclosure, the sensing unit may further sense at least one of current steering angle information and current steering torque information when a first compensation completion signal is received from the ESC apparatus; the determination unit may further determine whether the behavior of the trailer is in an unstable operation state by further using at least one of the sensed current steering angle information and the current steering torque information; and the control unit may further transmit a second compensation signal to an EPS apparatus to compensate the EPS apparatus in accordance with the set target EPS stable operation control information in order to stabilize the behavior of the trailer by a steering operation of the EPS apparatus according to at least one of the sensed current steering angle information and current steering torque information corresponding to the compensated target ESC stable operation control information when the behavior of the trailer is in the unstable operation state.

In accordance with another aspect of the present disclosure, the vehicle control apparatus may further include an identification unit that identifies that the current ESC apparatus operates unstably when the ESC is in the unstable operation state.

In accordance with another aspect of the present disclosure, the vehicle control apparatus may further include an identification unit that identifies that the current ESC apparatus is stably compensated when compensating the ESC apparatus in accordance with the target ESC stable operation control information.

In accordance with another aspect of the present disclosure, the vehicle control apparatus may further include an identification unit that identifies that the current ESC apparatus has been stably compensated when a first compensation completion signal is received from the ESC apparatus.

In accordance with another aspect of the present disclosure, the vehicle control apparatus may further include an identification unit that identifies that the behavior of the current trailer is unstably operated when the behavior of the trailer is in the unstable operation state.

In accordance with another aspect of the present disclosure, the vehicle control apparatus may further include an identification unit that identifies that the behavior of the current trailer is stabilized when the EPS apparatus is compensated in accordance with the target EPS stable operation control information.

In accordance with another aspect of the present disclosure, the vehicle control apparatus may further include an identification unit that identifies that the behavior of the current trailer has been stably compensated when a second compensation completion signal is received from the EPS apparatus.

In accordance with another aspect of the present disclosure, there may be provided a vehicle control method including: sensing current trailer connection information; determining whether a trailer is in a mounted state by using the sensed current trailer connection information; sensing at least one of current trailer load information, current trailer traction information, and current trailer relative angle information when the trailer is in the mounted state; determining whether an ESC (Electronic Stability Control) is in an unstable operation state by using at least one of the sensed current trailer load information, current trailer traction information, and current trailer relative angle information; and transmitting a first compensation signal to an ESC apparatus to compensate the ESC apparatus in accordance with the set target ESC stable operation control information in order to operate the ESC apparatus in a stable operation state according to at least one of the sensed current trailer load information, current trailer traction information, and current trailer relative angle information when the ESC is in the unstable operation state.

In accordance with another aspect of the present disclosure, the vehicle control method may further include: sensing at least one of current vehicle speed information, current wheel speed information, current steering angle information, and current YAW/G information when the trailer is in the mounted state; determining whether the ESC is in an unstable operation state by further using at least one of the sensed current vehicle speed information, current wheel speed information, current steering angle information, and current YAW/G information; and transmitting the first compensation signal to the ESC apparatus to compensate the ESC apparatus in accordance with the set target ESC stable operation control information in order to operate the ESC apparatus in a stable operation state according to at least one of the sensed current vehicle speed information, current wheel speed information, current steering angle information, current YAW/G information, current trailer connection information, current trailer load information, current trailer traction information, and current trailer relative angle information when the ESC is in the unstable operation state.

In accordance with another aspect of the present disclosure, the vehicle control method may further include: sensing at least one of current steering angle information and current steering torque information when a first compensation completion signal is received from the ESC apparatus; determining whether the behavior of the trailer is in an unstable operation state by further using at least one of the sensed current steering angle information and the current steering torque information; and transmitting a second compensation signal to an EPS apparatus to compensate the EPS apparatus in accordance with the set target EPS stable operation control information in order to stabilize the behavior of the trailer by a steering operation of the EPS apparatus according to at least one of the sensed current steering angle information and current steering torque information corresponding to the compensated target ESC stable operation control information when the behavior of the trailer is in the unstable operation state.

In accordance with another aspect of the present disclosure, the vehicle control method may further include identifying that the current ESC apparatus operates unstably when the ESC is in the unstable operation state.

In accordance with another aspect of the present disclosure, the vehicle control method may further include identifying that the current ESC apparatus is stably compensated when compensating the ESC apparatus in accordance with the target ESC stable operation control information.

In accordance with another aspect of the present disclosure, the vehicle control method may further include identifying that the current ESC apparatus has been stably compensated when a first compensation completion signal is received from the ESC apparatus.

In accordance with another aspect of the present disclosure, the vehicle control method may further include identifying that the behavior of the current trailer is unstably operated when the behavior of the trailer is in the unstable operation state.

In accordance with another aspect of the present disclosure, the vehicle control method may further include identifying that the behavior of the current trailer is stabilized when the EPS apparatus is compensated in accordance with the target EPS stable operation control information.

In accordance with another aspect of the present disclosure, the vehicle control method may further include identifying that the behavior of the current trailer has been stably compensated when a second compensation completion signal is received from the EPS apparatus.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
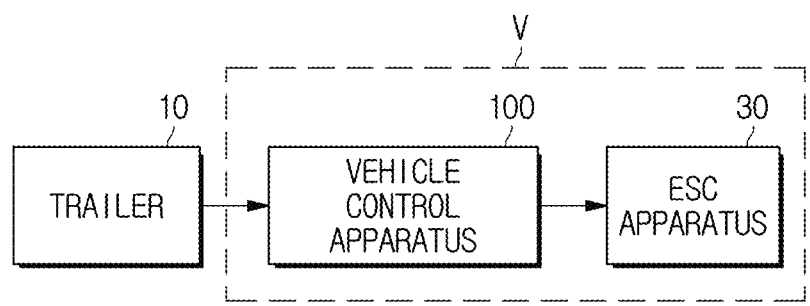
FIG. 1 is a block diagram illustrating a state in which a vehicle control apparatus according to an embodiment of the present disclosure is connected to a trailer and an ESC apparatus.
Figure 2:
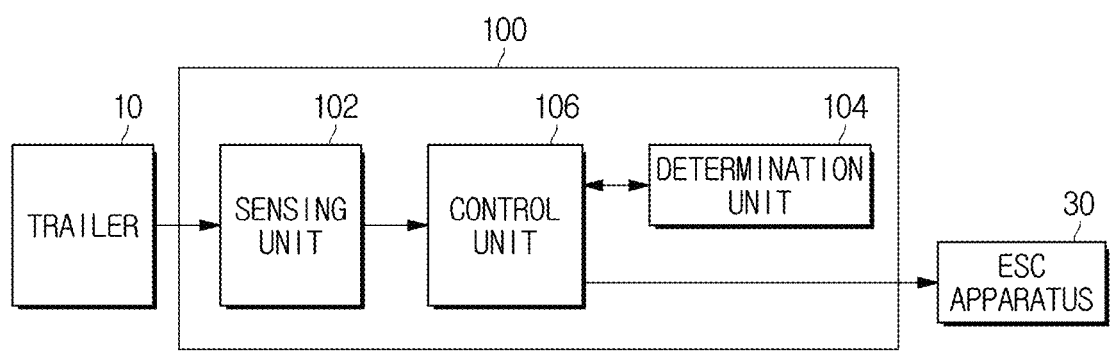
FIG. 2 is a block diagram illustrating an example of the vehicle control apparatus shown in FIG. 1.

FIG. 1 is a block diagram illustrating a state in which a vehicle control apparatus according to an embodiment of the present disclosure is connected to a trailer and an ESC apparatus, and FIG. 2 is a block diagram illustrating an example of the vehicle control apparatus shown in FIG. 1.

Figure 3:
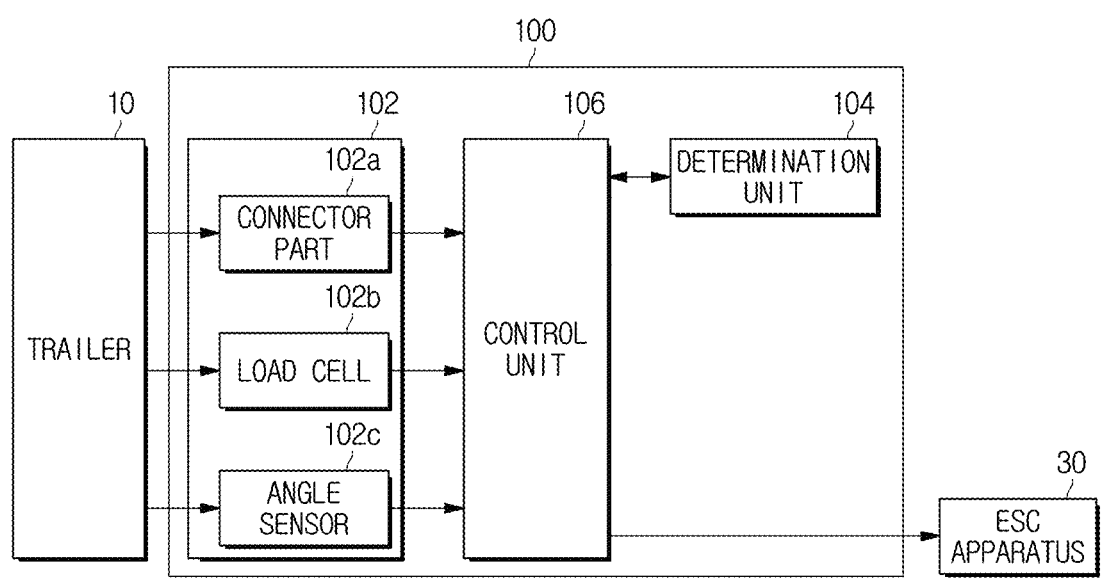
FIG. 3 is a block diagram illustrating an example of a sensing unit shown in FIG. 2.
Figure 4:
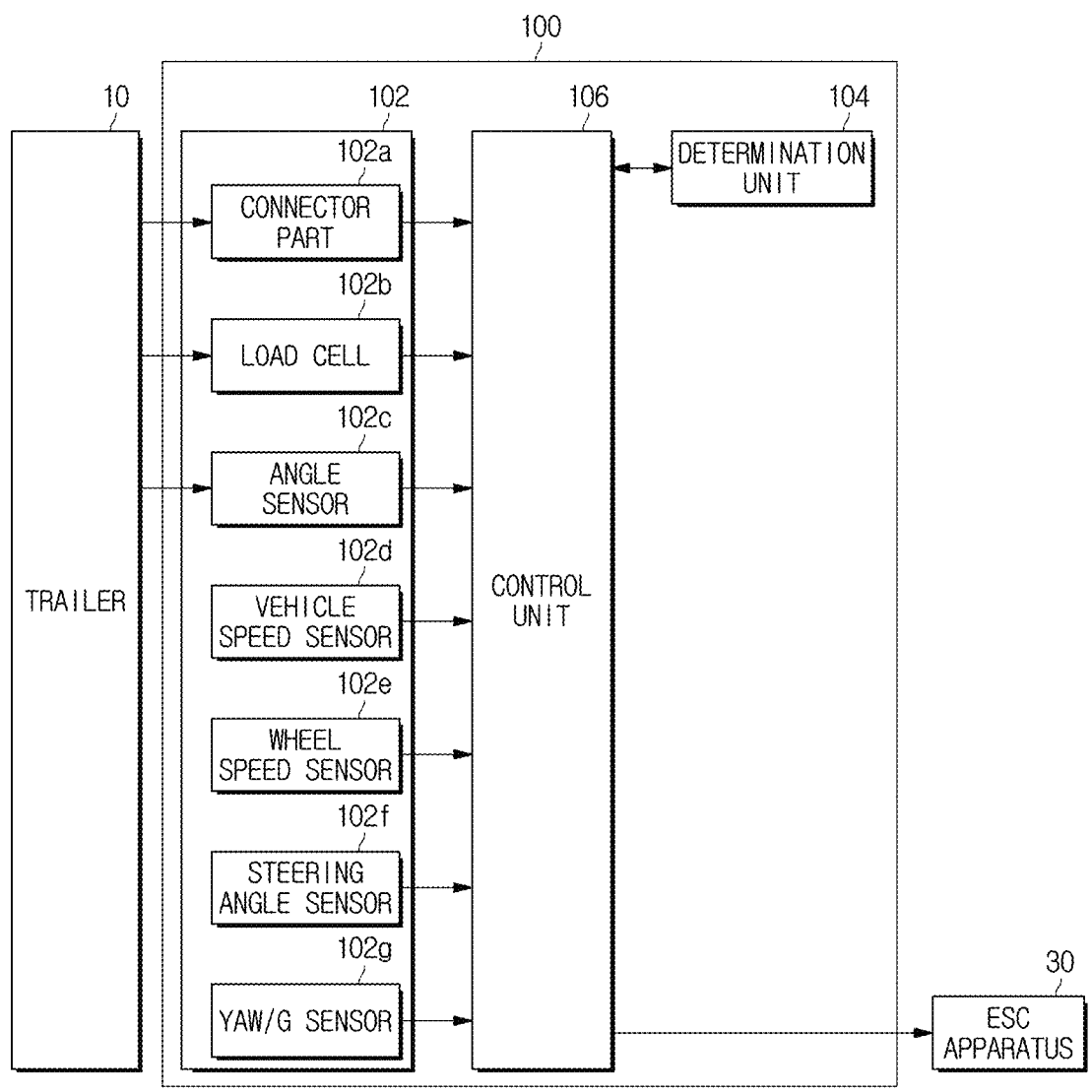
FIG. 4 is a block diagram illustrating another example of a sensing unit shown in FIG. 2.

FIG. 3 is a block diagram illustrating an example of the sensing unit shown in FIG. 2, and FIG. 4 is a block diagram illustrating another example of the sensing unit shown in FIG. 2.

Figure 5:
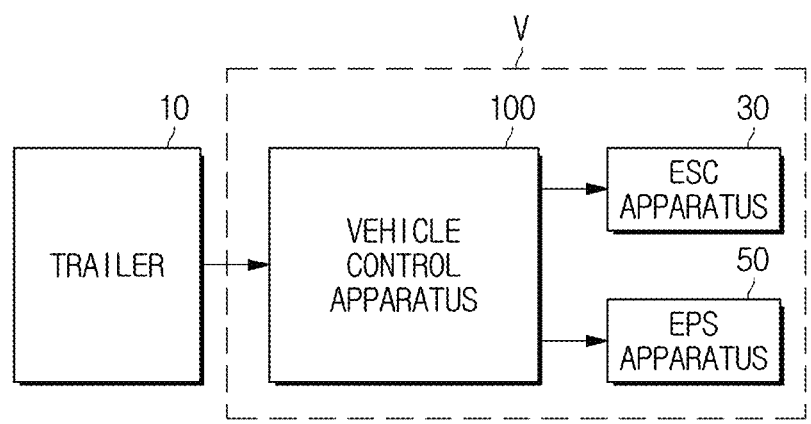
FIG. 5 is a block diagram illustrating a state in which a vehicle control apparatus according to an embodiment of the present disclosure is connected to a trailer, an ESC apparatus and an EPS apparatus.
Figure 6:
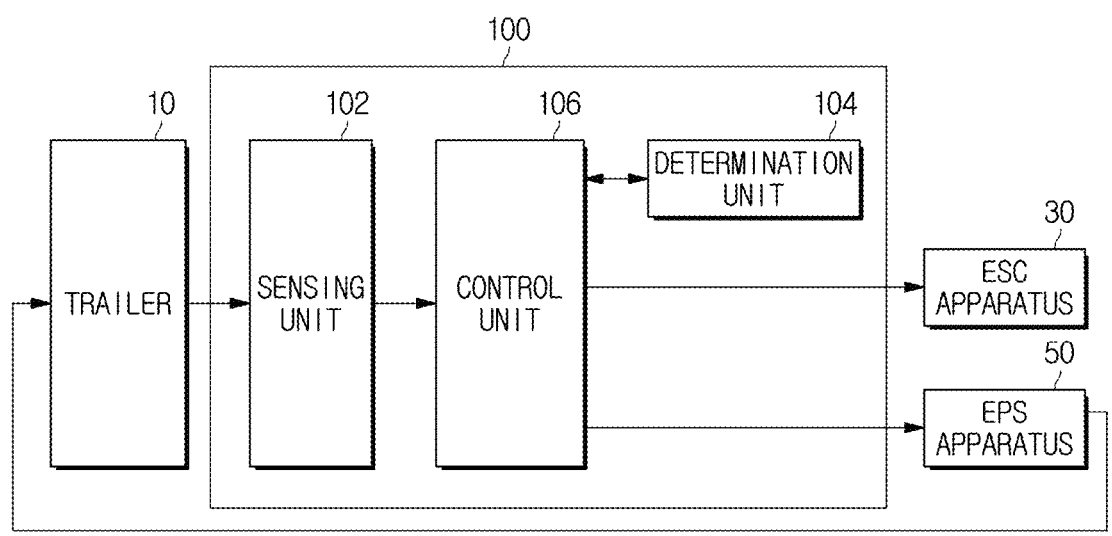
FIG. 6 is a block diagram illustrating an example of the vehicle control apparatus shown in FIG. 5.

FIG. 5 is a block diagram illustrating a state in which a vehicle control apparatus according to an embodiment of the present disclosure is connected to a trailer, an ESC apparatus and an EPS apparatus, and FIG. 6 is a block diagram illustrating an example of the vehicle control apparatus shown in FIG. 5.

Figure 7:
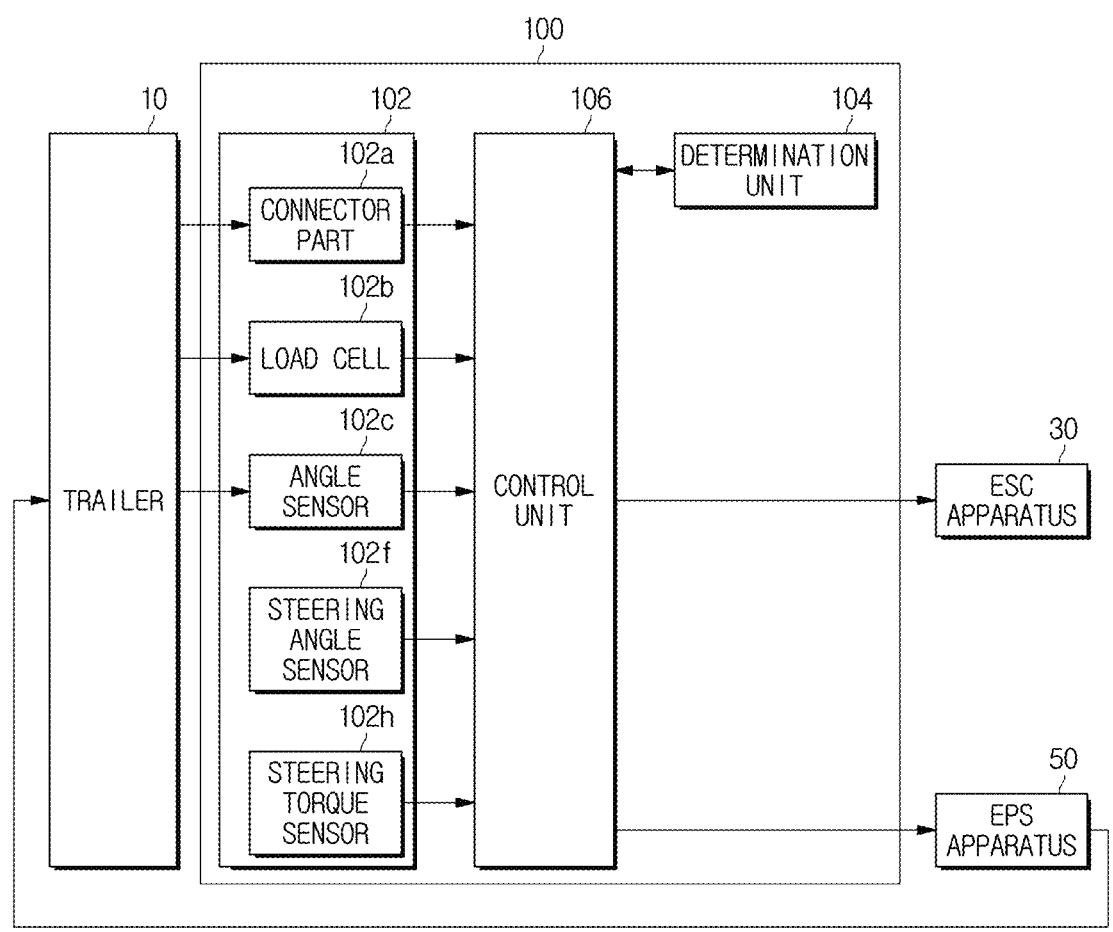
FIG. 7 is a block diagram illustrating an example of a sensing unit shown in FIG. 6.
Figure 8:
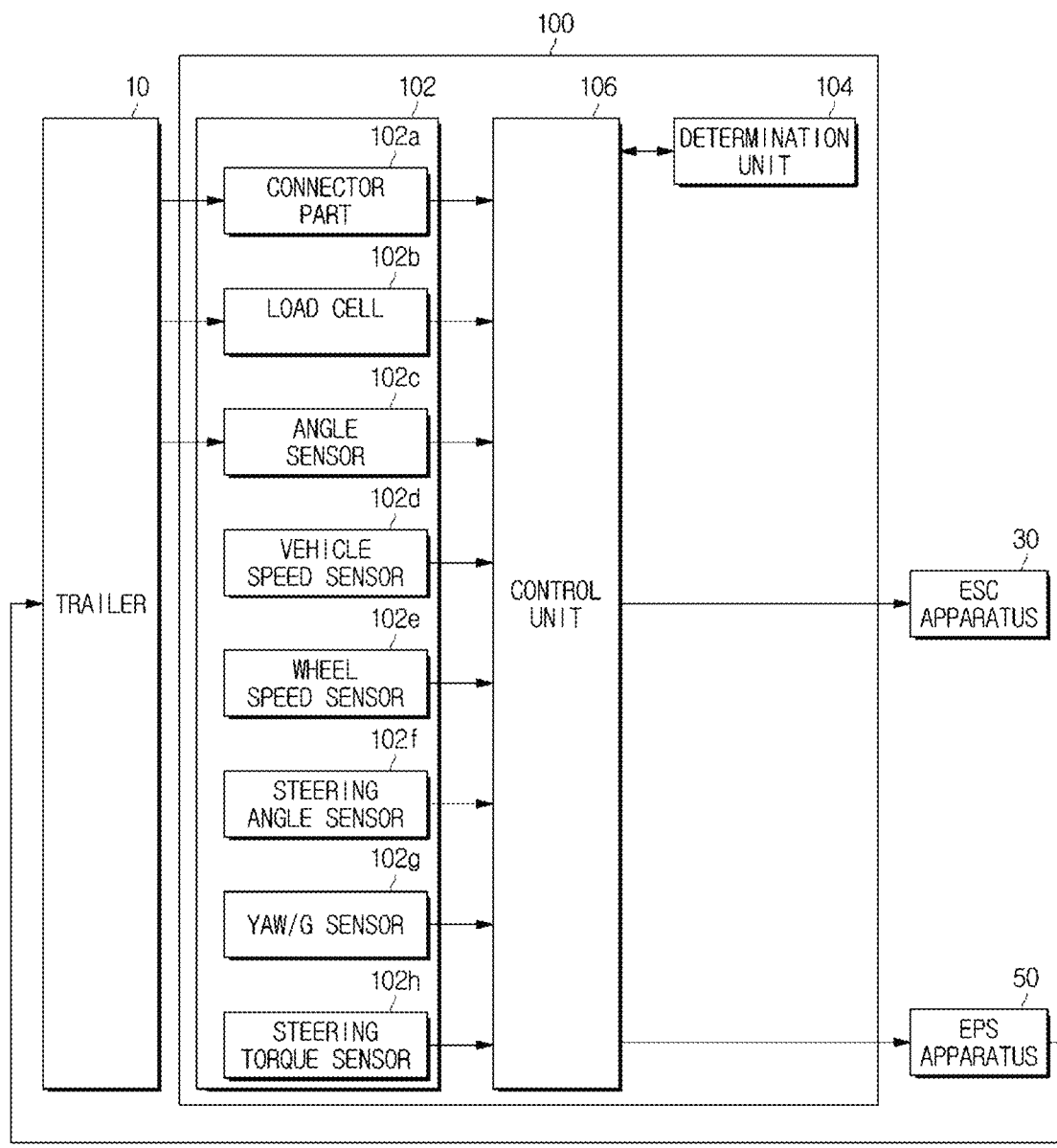
FIG. 8 is a block diagram illustrating another example of a sensing unit shown in FIG. 6.

FIG. 7 is a block diagram illustrating an example of a sensing unit shown in FIG. 6, and FIG. 8 is a block diagram illustrating another example of a sensing unit shown in FIG. 6.

Figure 9:
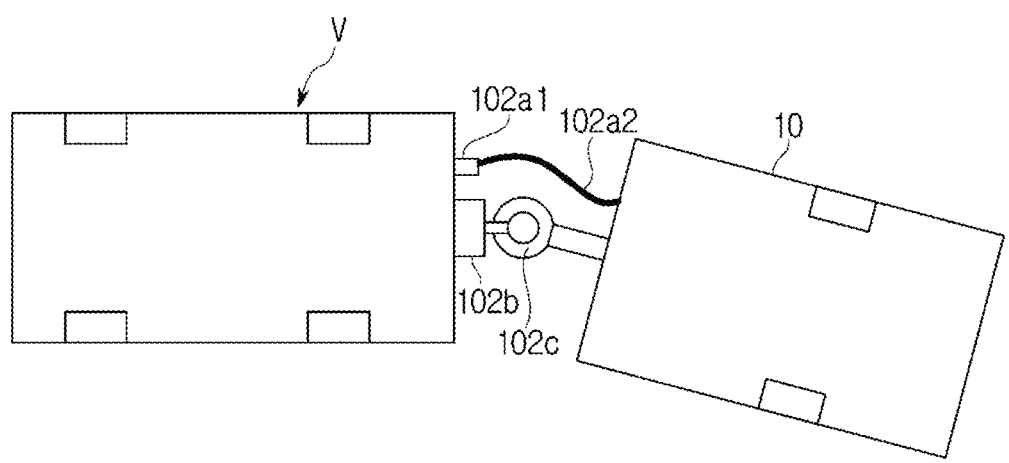
FIG. 9 is a plan view for illustrating, as an example, a state in which a connector part, a load cell, and an angle sensor shown in FIGS. 3, 4, 7, and 8 are mounted on a vehicle and a trailer.

FIG. 9 is a plan view for illustrating, as an example, a state in which a connector part, a load cell, and an angle sensor shown in FIGS. 3, 4, 7, and 8 are mounted on a vehicle and a trailer.

Referring to FIGS. 1 to 9, a vehicle control apparatus 100 according to an embodiment of the present disclosure includes a sensing unit 102, a determination unit 104, and a control unit 106.

The sensing unit 102 senses at least one of current trailer connection information, current trailer load information, current trailer traction information, and current trailer relative angle information.

As an example, as shown in FIG. 3, the sensing unit 102 may include a connector part 102a, a load cell 102b, and an angle sensor 102c.

The connector part 102a may sense current trailer connection information, the load cell 102b may sense current trailer load information and current trailer traction information, and the angle sensor 102c may sense current trailer relative angle information.

As another example, as shown in FIGS. 3 and 9, a connection sensing sensor 102a1 of the connector part 102a may be provided at one side of a vehicle V, and a connection cable 102a2 of the connector part 102a may be provided at one end of a trailer 10 and may be connected to the connection sensing sensor 102a1.

The load cell 102b may be provided at the other side of the vehicle V, and the angle sensor 102c may be provided at a position where the vehicle V and the trailer 10 are connected.

The determination unit 104 determines whether the trailer 10 is in a mounted state by using the current trailer connection information sensed by the sensing unit 102 according to the control of the control unit 106 which will be described later.

Further, when it is determined that the trailer 10 is in the mounted state, the determination unit 104 determines whether or not an ESC (Electronic Stability Control) is in an unstable operation state according to the control of the control unit 106 by using at least one of the current trailer load information, the current trailer traction information, and the current trailer relative angle information which are sensed from the sensing unit 102.

As an example, when it is determined that the trailer 10 is in the mounted state, the determination unit 104 determines whether or not the ESC is in an unstable operation state according to the control of the control unit 106 by using a TSC (Trailer Stability Control) using at least one of the current trailer load information, the current trailer traction information, and the current trailer relative angle information which are sensed from the sensing unit 102.

As another example, when determining whether the ESC is in an unstable operation state, the determination unit 104 may determine whether the current trailer load information sensed by the sensing unit 102 is not the set target trailer load information according to the control of the control unit 106.

For example, when determining whether the ESC is in an unstable operation state, the determination unit 104 may determine whether the current trailer load value sensed by the sensing unit 102 is out of the set target trailer load value range according to the control of the control unit 106.

That is, when determining whether the ESC is in an unstable operation state, the determination unit 104 may determine whether the current trailer load value sensed by the sensing unit 102 is greater than 750 kg that is in the set target trailer load value range according to the control of the control unit 106.

Further, when determining whether the ESC is in an unstable operation state, the determination unit 104 may determine whether the current trailer traction information sensed by the sensing unit 102 is not the set target trailer traction information according to the control of the control unit 106.

For example, when determining whether the ESC is in an unstable operation state, the determination unit 104 may determine whether the current trailer traction force sensed by the sensing unit 102 is out of the set target trailer traction force range according to the control of the control unit 106.

That is, when determining whether the ESC is in an unstable operation state, the determination unit 104 may determine whether the current trailer traction force sensed by the sensing unit 102 is greater than 400 kgf that is in the set target trailer traction force range according to the control of the control unit 106.

Further, when determining whether the ESC is in an unstable operation state, the determination unit 104 may determine whether the current trailer relative angle information sensed by the sensing unit 102 is not the set target trailer relative angle information according to the control of the control unit 106.

For example, when determining whether the ESC is in an unstable operation state, the determination unit 104 may determine whether the current trailer relative angle value sensed by the sensing unit 102 is out of the set target trailer relative angle value range according to the control of the control unit 106.

That is, when determining whether the ESC is in an unstable operation state, the determination unit 104 may determine whether the current trailer relative angle value sensed by the sensing unit 102 is greater than 5 degrees that is in the set target trailer relative angle value range according to the control of the control unit 106.

When the determination unit 104 determines that the ESC is in the unstable operation state, the control unit 106 may transmit a first compensation signal to an ESC apparatus 30 to compensate the ESC apparatus 30 in accordance with the set target ESC stable operation control information in order to operate the ESC apparatus 30 in a stable operation state according to at least one of the current trailer load information, current trailer traction information, and current trailer relative angle information sensed by the sensing unit 102.

As shown in FIG. 4, the sensing unit 102 of the vehicle control apparatus 100 according to an embodiment of the present disclosure may further sense at least one of current vehicle speed information, current wheel speed information, current steering angle information, and YAW/G information.

As an example, as shown in FIG. 4, the sensing unit 102 may include a vehicle speed sensor 102d, a wheel speed sensor 102e, a steering angle sensor 102f, and an YAW/G sensor 102g.

The vehicle speed sensor 102d may sense current vehicle speed information, the wheel speed sensor 102e may sense current wheel speed information, the steering angle sensor 102f may sense current steering angle information, and the YAW/G sensor 102g may sense current YAW/G information.

Further, the determination unit 104 of the vehicle control apparatus 100 according to an embodiment of the present disclosure may further determine whether the ESC is in an unstable operation state according to the control of the control unit 106 by further using at least one of the current vehicle speed information, current wheel speed information, current steering angle information, and current YAW/G information which are sensed by the sensing unit 102.

As an example, when determining whether the ESC is in an unstable operation state, the determination unit 104 may determine whether the current vehicle speed information sensed by the sensing unit 102 is not the set target vehicle speed information according to the control of the control unit 106.

For example, when determining whether the ESC is in an unstable operation state, the determination unit 104 may determine whether the current vehicle speed value sensed by the sensing unit 102 is out of the set target vehicle speed value range according to the control of the control unit 106.

That is, when determining whether the ESC is in an unstable operation state, the determination unit 104 may determine whether the current vehicle speed value sensed by the sensing unit 102 is greater than 60 kph that is in the set target vehicle speed value range according to the control of the control unit 106.

Further, when determining whether the ESC is in an unstable operation state, the determination unit 104 may determine whether the current wheel speed information sensed by the sensing unit 102 is not the set target wheel speed information according to the control of the control unit 106.

For example, when determining whether the ESC is in an unstable operation state, the determination unit 104 may determine whether the current wheel speed value sensed by the sensing unit 102 is out of the set target wheel speed value range according to the control of the control unit 106.

That is, when determining whether the ESC is in an unstable operation state, the determination unit 104 may determine whether the current wheel speed value sensed by the sensing unit 102 is greater than 60 kph that is in the set target wheel speed value range according to the control of the control unit 106.

Further, when determining whether the ESC is in an unstable operation state, the determination unit 104 may determine whether the current steering angle information sensed by the sensing unit 102 is not the set target steering angle information according to the control of the control unit 106.

For example, when determining whether the ESC is in an unstable operation state, the determination unit 104 may determine whether the current steering angle value sensed by the sensing unit 102 is out of the set target steering angle value range according to the control of the control unit 106.

That is, when determining whether the ESC is in an unstable operation state, the determination unit 104 may determine whether the current steering angle value sensed by the sensing unit 102 is greater than 15 degrees that is in the set target steering angle value range according to the control of the control unit 106.

Further, when determining whether the ESC is in an unstable operation state, the determination unit 104 may determine whether the current YAW/G information sensed by the sensing unit 102 is not the set target YAW/G information according to the control of the control unit 106.

For example, when determining whether the ESC is in an unstable operation state, the determination unit 104 may determine whether the current YAW/G value sensed by the sensing unit 102 is out of the set target YAW/G value range according to the control of the control unit 106.

That is, when determining whether the ESC is in an unstable operation state, the determination unit 104 may determine whether the current YAW/G value sensed by the sensing unit 102 is greater than 0.2 g that is in the set target YAW/G value range according to the control of the control unit 106.

As shown in FIGS. 6 to 8, the sensing unit 102 of the vehicle control apparatus 100 according to an embodiment of the present disclosure may further sense at least one of current steering angle information and current steering torque information.

As an example, as shown in FIGS. 7 and 8, the sensing unit 102 may include the steering angle sensor 102*f* and a steering torque sensor 102*h*.

The steering angle sensor 102*f* may sense current steering angle information, and the steering torque sensor 102*h* may sense current steering torque information.

The determination unit 104 may further determine whether the behavior of the trailer 10 is in an unstable operation state by further using at least one of current steering angle information and current steering torque information according to the control of the control unit 106.

As an example, when determining whether the behavior of the trailer 10 is in an unstable operation state, the determination unit 104 may determine whether the current steering angle information sensed by the sensing unit 102 is not the set target steering angle information according to the control of the control unit 106.

For example, when determining whether the behavior of the trailer 10 is in an unstable operation state, the determination unit 104 may determine whether the current steering angle value sensed by the sensing unit 102 is out of the set target steering angle value range according to the control of the control unit 106.

That is, when determining whether the behavior of the trailer 10 is in an unstable operation state, the determination unit 104 may determine whether the current steering angle value sensed by the sensing unit 102 is greater than 15 degrees that is in the set target steering angle value range according to the control of the control unit 106.

Further, when determining whether the behavior of the trailer 10 is in an unstable operation state, the determination unit 104 may determine whether the current steering torque information sensed by the sensing unit 102 is not the set target steering torque information according to the control of the control unit 106.

For example, when determining whether the behavior of the trailer 10 is in an unstable operation state, the determination unit 104 may determine whether the current steering torque value sensed by the sensing unit 102 is out of the set target steering torque value range according to the control of the control unit 106.

That is, when determining whether the behavior of the trailer 10 is in an unstable operation state, the determination unit 104 may determine whether the current steering torque value sensed by the sensing unit 102 is greater than 3 Nm that is in the set target steering torque value range according to the control of the control unit 106.

The control unit 106 may further transmit a second compensation signal to an EPS apparatus 50 to compensate the EPS apparatus 50 in accordance with the set target EPS stable operation control information in order to stabilize the behavior of the trailer 10 by a steering operation of the EPS apparatus 50 according to at least one of the current steering angle information and current steering torque information sensed by the sensing unit 102 corresponding to the compensated target ESC stable operation control information when the behavior of the trailer 10 is in the unstable operation state.

Figure 10:
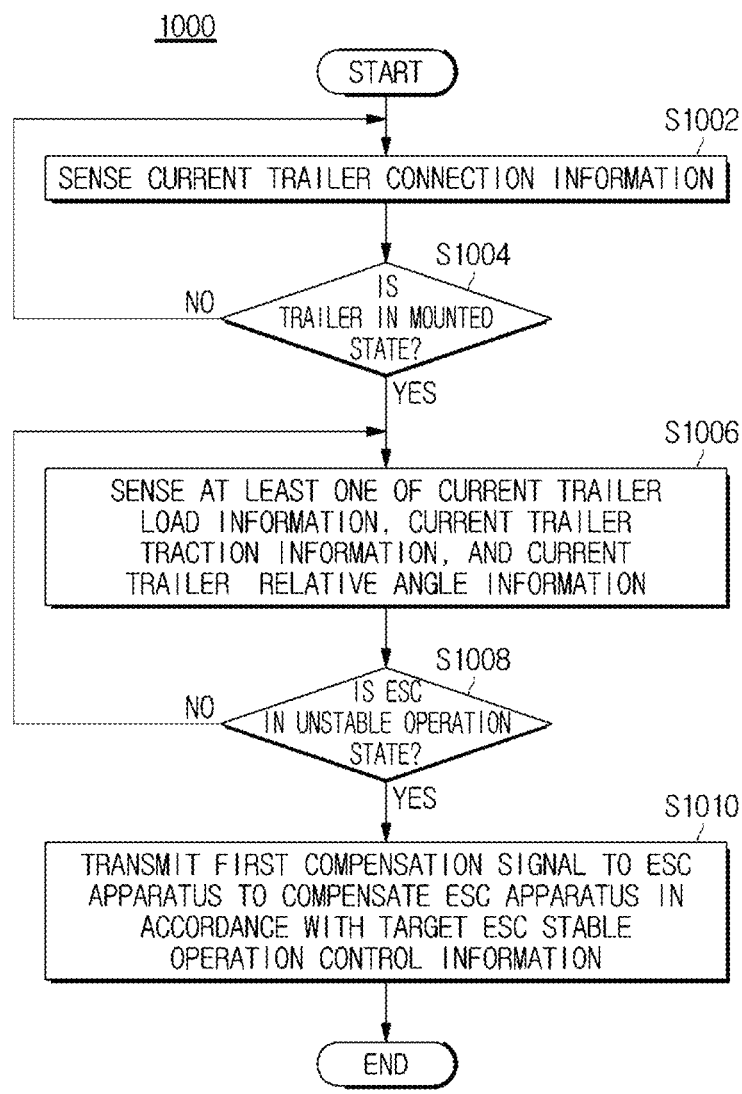
FIG. 10 is a flowchart illustrating an example of a vehicle control method for a vehicle control apparatus according to an embodiment of the present disclosure.
Figure 11:
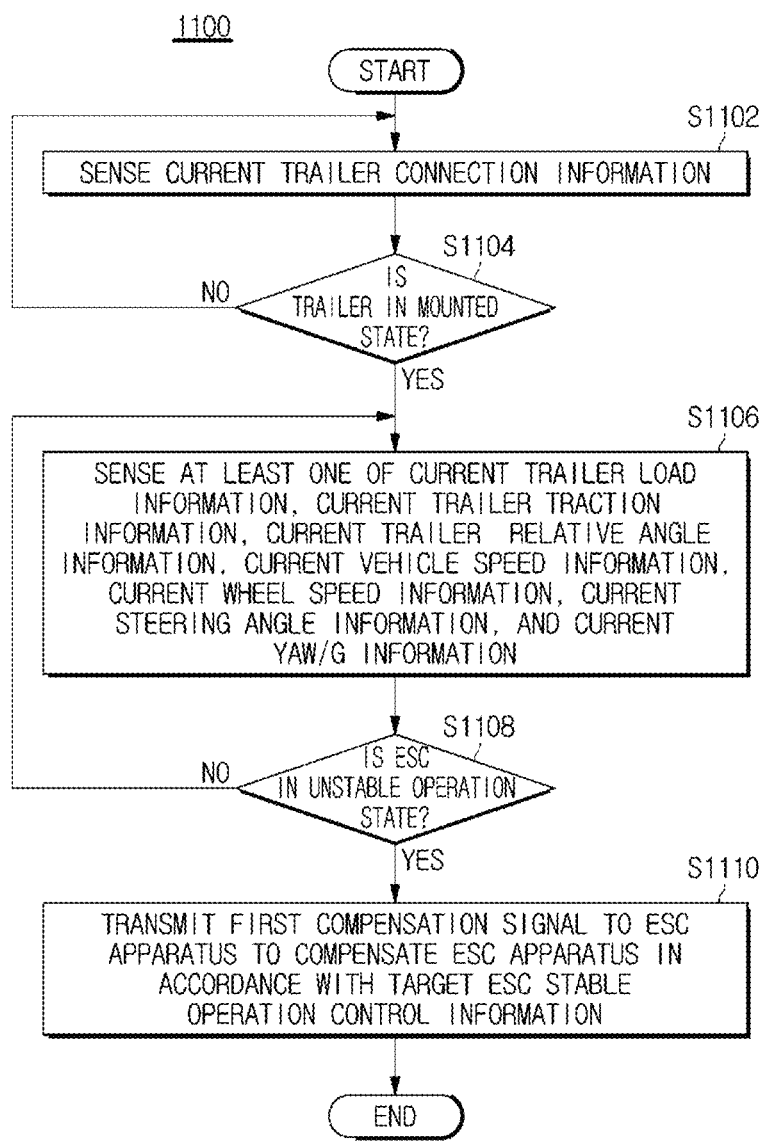
FIG. 11 is a flowchart illustrating another example of a vehicle control method for a vehicle control apparatus according to an embodiment of the present disclosure.

FIG. 10 is a flowchart illustrating an example of a vehicle control method for a vehicle control apparatus according to an embodiment of the present disclosure, and FIG. 11 is a flowchart illustrating another example of a vehicle control method for a vehicle control apparatus according to an embodiment of the present disclosure.

Figure 12:
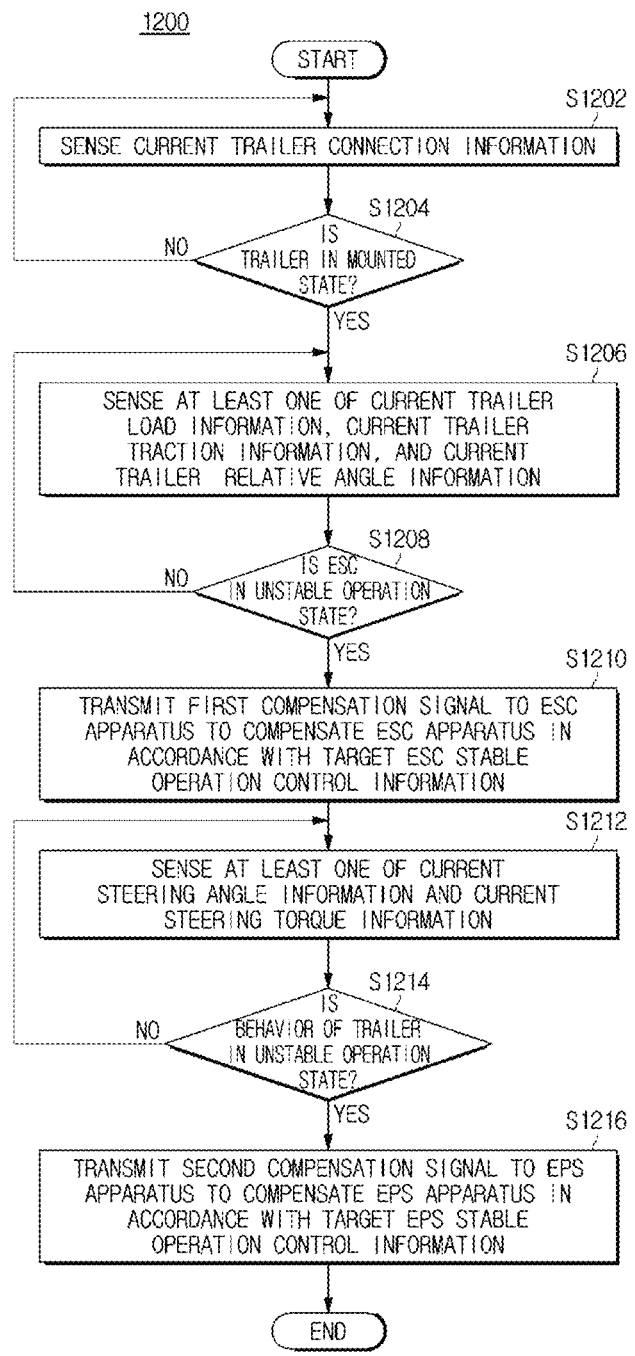
FIG. 12 is a flowchart illustrating another example of a vehicle control method for a vehicle control apparatus according to an embodiment of the present disclosure.
Figure 13:
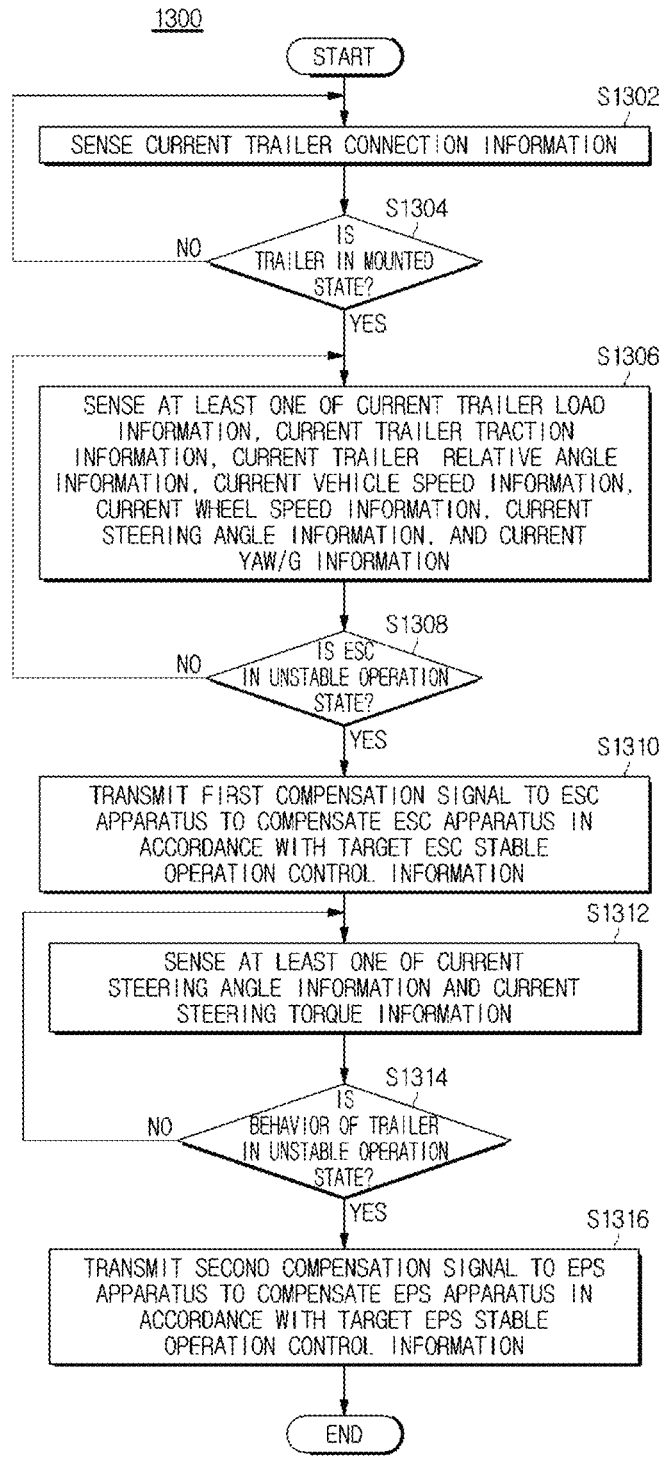
FIG. 13 is a flowchart illustrating another example of a vehicle control method for a vehicle control apparatus according to an embodiment of the present disclosure.

FIG. 12 is a flowchart illustrating another example of a vehicle control method for a vehicle control apparatus according to an embodiment of the present disclosure, and FIG. 13 is a flowchart illustrating another example of a vehicle control method for a vehicle control apparatus according to an embodiment of the present disclosure.

Referring to FIGS. 10 to 13, vehicle control methods 1000 to 1300 for the vehicle control apparatus 00 (FIGS. 1 to 8) according to an embodiment of the present disclosure may include first sensing steps (S1002 to S1302), first determination steps (S1004 to S1304), second sensing steps (S1006 to S1306), second determination steps (S1008 to S1308), and first compensation steps (S1010 to S1310), respectively.

First, in the first sensing steps (S1002 to S1302), current trailer connection information is sensed by the sensing unit 102 (FIGS. 2 to 4 and 6 to 8).

Thereafter, in the first determination steps (S1004 to S1304), whether or not a trailer is in a mounted state is determined by the determination unit 104 (FIGS. 2 to 4 and 6 to 8) by using the current trailer connection information sensed by the sensing unit 102 (FIGS. 2 to 4 and 6 to 8) according to the control of the control unit 106 (FIGS. 2 to 4 and 6 to 8).

Thereafter, in the second sensing steps (S1006 to S1306), when it is determined that the trailer is in the mounted state by the determination unit 104 (FIGS. 2 to 4 and 6 to 8), at least one of current trailer load information, current trailer traction information, and current trailer relative angle information is sensed by the sensing unit 102 (FIGS. 2 to 4 and 6 to 8).

Thereafter, in the second determination steps (S1008 to S1308), whether or not an ESC (Electronic Stability Control) is in an unstable operation state is determined by the determination unit 104 (FIGS. 2 to 4 and 6 to 8) by using at least one of the current trailer load information, current trailer traction information, and current trailer relative angle information sensed by the sensing unit 102 (FIGS. 2 to 4 and 6 to 8) according to the control of the control unit 106 (FIGS. 2 to 4 and 6 to 8).

As an example, when the determination unit 104 (FIGS. 2 to 4 and 6 to 8) determines whether or not the ESC is in an unstable operation state in the second determination steps (S1008 to S1308), whether the current trailer load information sensed by the sensing unit 102 (FIGS. 2 to 4 and 6 to 8) is not the target trailer load information set in the determination unit 104 (FIGS. 2 to 4 and 6 to 8) may be determined by the determination unit 104 (FIGS. 2 to 4 and 6 to 8) according to the control of the control unit 106 (FIGS. 2 to 4 and 6 to 8).

Further, when the determination unit 104 (FIGS. 2 to 4 and 6 to 8) determines whether or not the ESC is in an unstable operation state in the second determination steps (S1008 to S1308), whether the current trailer traction information sensed by the sensing unit 102 (FIGS. 2 to 4 and 6 to 8) is not the target trailer traction information set in the determination unit 104 (FIGS. 2 to 4 and 6 to 8) may be determined by the determination unit 104 (FIGS. 2 to 4 and 6 to 8) according to the control of the control unit 106 (FIGS. 2 to 4 and 6 to 8).

Further, when the determination unit 104 (FIGS. 2 to 4 and 6 to 8) determines whether or not the ESC is in an unstable operation state in the second determination steps (S1008 to S1308), whether the current trailer relative angle information sensed by the sensing unit 102 (FIGS. 2 to 4 and 6 to 8) is not the target trailer relative angle information set in the determination unit 104 (FIGS. 2 to 4 and 6 to 8) may be determined by the determination unit 104 (FIGS. 2 to 4 and 6 to 8) according to the control of the control unit 106 (FIGS. 2 to 4 and 6 to 8).

Thereafter, in the first compensation steps (S1010 to S1310), when it is determined that the ESC is in the unstable operation state by the determination unit 104 (FIGS. 2 to 4 and 6 to 8), a first compensation signal is transmitted to the ESC apparatus 30 (FIGS. 2 to 4 and 6 to 8) by the control unit 106 (FIGS. 2 to 4 and 6 to 8) to compensate the ESC apparatus 30 (FIGS. 2 to 4 and 6 to 8) in accordance with the target ESC stable operation control information set in the control unit 106 (FIGS. 2 to 4 and 6 to 8) in order to operate the ESC apparatus 30 (FIGS. 2 to 4 and 6 to 8) in a stable operation state according to at least one of the current trailer load information, current trailer traction information, and current trailer relative angle information sensed by the sensing unit 102 (FIGS. 2 to 4 and 6 to 8).

Further, referring to FIGS. 11 and 13, the vehicle control methods (1100 and 1300) for the vehicle control apparatus 100 (FIGS. 4 and 8) according to an embodiment of the present disclosure may include the second sensing steps (S1106 and S1306), the second determination steps (S1108 and S1308), and first compensation steps (S1110 and S1310), respectively.

First, in the second sensing steps (S1106 and S1306), when it is determined that the trailer is in the mounted state by the determination unit 104 (FIGS. 4 and 8), at least one of current vehicle speed information, current wheel speed information, current steering angle information, and current YAW/G information may further be sensed by the sensing unit 102 (FIGS. 4 and 8).

Thereafter, in the second determination steps (S1108 and S1308), whether or not the ESC is in an unstable operation state may be determined by the determination unit 104 (FIGS. 4 and 8) by further using at least one of the current vehicle speed information, current wheel speed information, current steering angle information, and current YAW/G information sensed by the sensing unit 102 (FIGS. 4 and 8) according to the control of the control unit 106 (FIGS. 4 and 8).

As an example, in the second determination steps (S1108 and S1308), when the determination unit 104 (FIGS. 4 and 8) determines whether or not the ESC is in an unstable operation state, whether the current vehicle speed information sensed by the sensing unit 102 (FIGS. 4 and 8) is not the target vehicle speed information set in the determination unit 104 (FIGS. 4 and 8) may be determined by the determination unit 104 (FIGS. 4 and 8) according to the control of the control unit 106 (FIGS. 4 and 8).

Further, in the second determination steps (S1108 and S1308), when the determination unit 104 (FIGS. 4 and 8) determines whether or not the ESC is in an unstable operation state, whether the current wheel speed information sensed by the sensing unit 102 (FIGS. 4 and 8) is not the target wheel speed information set in the determination unit 104 (FIGS. 4 and 8) may be determined by the determination unit 104 (FIGS. 4 and 8) according to the control of the control unit 106 (FIGS. 4 and 8).

Further, in the second determination steps (S1108 and S1308), when the determination unit 104 (FIGS. 4 and 8) determines whether or not the ESC is in an unstable operation state, whether the current steering angle information sensed by the sensing unit 102 (FIGS. 4 and 8) is not the target steering angle information set in the determination unit 104 (FIGS. 4 and 8) may be determined by the determination unit 104 (FIGS. 4 and 8) according to the control of the control unit 106 (FIGS. 4 and 8).

Further, in the second determination steps (S1108 and S1308), when the determination unit 104 (FIGS. 4 and 8) determines whether or not the ESC is in an unstable operation state, whether the current YAW/G information sensed by the sensing unit 102 (FIGS. 4 and 8) is not the target YAW/G information set in the determination unit 104 (FIGS. 4 and 8) may be determined by the determination unit 104 (FIGS. 4 and 8) according to the control of the control unit 106 (FIGS. 4 and 8).

Thereafter, in the first compensation steps (S1110 and S1310), when it is determined that the ESC is in the unstable operation state by the determination unit 104 (FIGS. 4 and 8), the first compensation signal may be further transmitted to the ESC apparatus 30 (FIGS. 4 and 8) by the control unit 106 (FIGS. 4 and 8) to compensate the ESC apparatus 30 (FIGS. 4 and 8) in accordance with the target ESC stable operation control information set in the control unit 106 (FIGS. 4 and 8) in order to operate the ESC apparatus 30 (FIGS. 4 and 8) in a stable operation state according to at least one of the current vehicle speed information, current wheel speed information, current steering angle information, and current YAW/G information sensed by the sensing unit 102 (FIGS. 4 and 8).

Further, referring to FIGS. 12 and 13, the vehicle control methods (1200 and 1300) for the vehicle control apparatus 100 (FIGS. 6 to 8) according to an embodiment of the present disclosure may include third sensing steps (S1212 and S1312), third determination steps (S1214 and S1314), and second compensation steps (S1216 and S1316), respectively.

First, in the third sensing steps (S1212 and S1312), when the first compensation signal is received from the ESC apparatus 30 (FIGS. 4 and 8) by the control unit 106 (FIGS. 4 and 8), at least one of current steering angle information and current steering torque information may be sensed by the sensing unit 102 (FIGS. 4 and 8).

Thereafter, in the third determination steps (S1214 and S1314), whether or not the behavior of the trailer is in an unstable operation state may be determined by the determination unit 104 (FIGS. 4 and 8) by using at least one of the current steering angle information and current steering torque information sensed by the sensing unit 102 (FIGS. 4 and 8) according to the control of the control unit 106 (FIGS. 4 and 8).

As an example, in the third determination steps (S1214 and S1314), when it is determined whether or not the behavior of the trailer is in an unstable operation state by the determination unit 104 (FIGS. 4 and 8), whether the current steering angle information sensed by the sensing unit 102 (FIGS. 4 and 8) is not the target steering angle information set in the determination unit 104 (FIGS. 4 and 8) may be determined by the determination unit 104 (FIGS. 4 and 8) according to the control of the control unit 106 (FIGS. 4 and 8).

Further, in the third determination steps (S1214 and S1314), when it is determined whether or not the behavior of the trailer is in an unstable operation state by the determination unit 104 (FIGS. 4 and 8), whether the current steering torque information sensed by the sensing unit 102 (FIGS. 4 and 8) is not the target steering torque information set in the determination unit 104 (FIGS. 4 and 8) may be determined by the determination unit 104 (FIGS. 4 and 8) according to the control of the control unit 106 (FIGS. 4 and 8).

Thereafter, in the second compensation steps (S1216 and S1316), when it is determined that the behavior of the trailer is in the unstable operation state by the determination unit 104 (FIGS. 6 to 8), a second compensation signal may be transmitted to the EPS apparatus 50 (FIGS. 6 to 8) by the control unit 106 (FIGS. 6 to 8) to compensate the EPS apparatus 50 (FIGS. 6 to 8) in accordance with the target EPS stable operation control information set in the control unit 106 (FIGS. 6 to 8) in order to stabilize the behavior of the trailer 10 (FIGS. 6 and 8) by a steering operation of the EPS apparatus 50 (FIGS. 6 to 8) according to at least one of the current steering angle information current steering torque information sensed by the sensing unit 102 (FIGS. 6 to 8) corresponding to the compensated target ESC stable operation control information.

Figure 14:
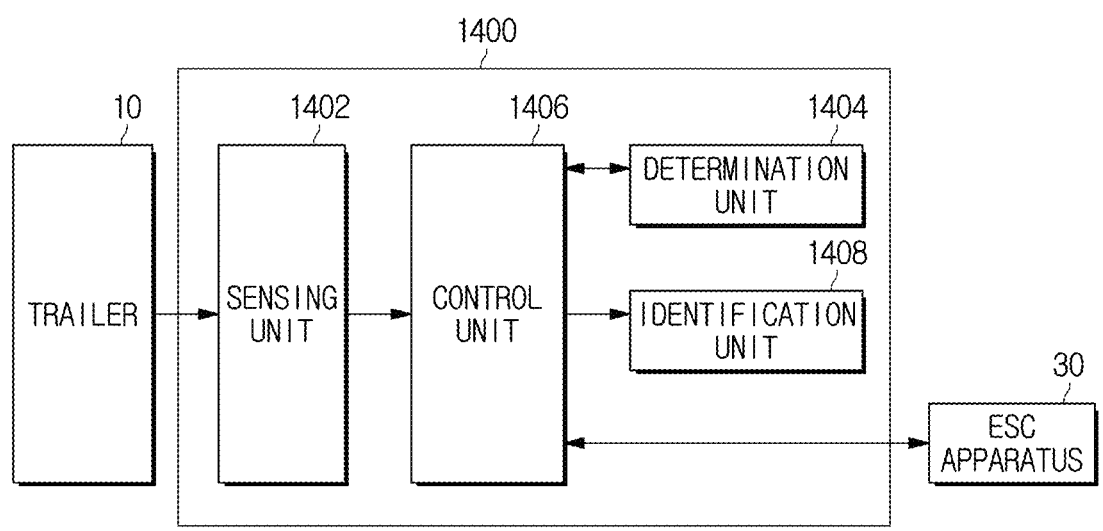
FIG. 14 is a block diagram illustrating another example of a vehicle control apparatus according to an embodiment of the present disclosure.

FIG. 14 is a block diagram illustrating another example of a vehicle control apparatus according to an embodiment of the present disclosure.

Referring to FIG. 14, a vehicle control apparatus 1400 according to an embodiment of the present disclosure includes a sensing unit 1402, a determination unit 1404, and a control unit 1406 in the same manner as the vehicle control apparatus 100 (FIG. 2).

The functions of the respective components and the organic connection relation between the components of the vehicle control device 1400 according to an embodiment of the present disclosure are the same as those of the vehicle control apparatus (100 of FIG. 2), and thus additional descriptions thereof will be omitted.

The vehicle control apparatus 1400 according to an embodiment of the present disclosure may further include an identification unit 1408.

That is, when it is determined that the ESC is in the unstable operation state by the determination unit 1404, the identification unit 1408 may identify that the current ESC apparatus 30 operates unstably according to the control of the control unit 1406.

Further, when the ESC apparatus 30 is compensated by the control unit 1406 in accordance with the target ESC stable operation control information, the identification unit 1408 may identify that the current ESC apparatus 30 is stably compensated according to the control of the control unit 1406.

Further, when a first compensation completion signal output from the ESC apparatus 30 is received in the control unit 1406, the identification unit 1408 may identify that the current ESC apparatus 30 has been stably compensated according to the control of the control unit 1406.

As an example, although not shown, the identification unit 1408, by including at least one of a warning device (not shown), a speaker (not shown), and a light emitting member (not shown) which are provided so that a driver can identify the information or state of the vehicle, may identify that the current ESC apparatus 30 operates unstably, identify that the current ESC apparatus 30 is stably compensated, and identify that the current ESC apparatus 30 has been stably compensated, through at least one operation of the warning operation of the warning device, the voice operation of the speaker, and the light emitting operation of the light emitting member.

Further, although not shown, the identification unit 1408, by including at least one of an HMI (Human Machine Interface) module (not shown) and a HUD (Head-Up Display) module (not shown) installed as a user interface and a machine so that a driver can grasp the information or status of the vehicle, may identify that the current ESC apparatus 30 operates unstably, identify that the current ESC apparatus 30 is stably compensated, and identify that the current ESC apparatus 30 has been stably compensated, through at least one operation of the HMI message display operation of the HMI module and the HUD message display operation of the HUD module.

Figure 15:
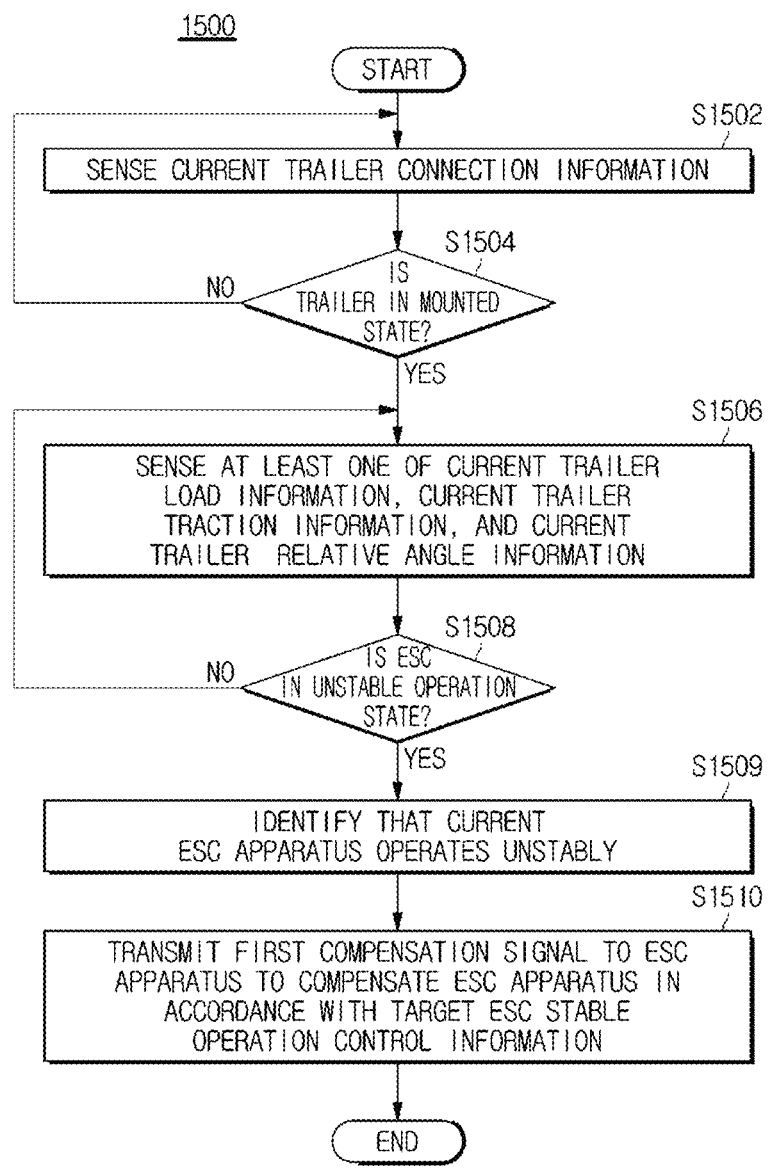
FIG. 15 is a flowchart illustrating another example of a vehicle control method for a vehicle control apparatus according to an embodiment of the present disclosure.
Figure 16:
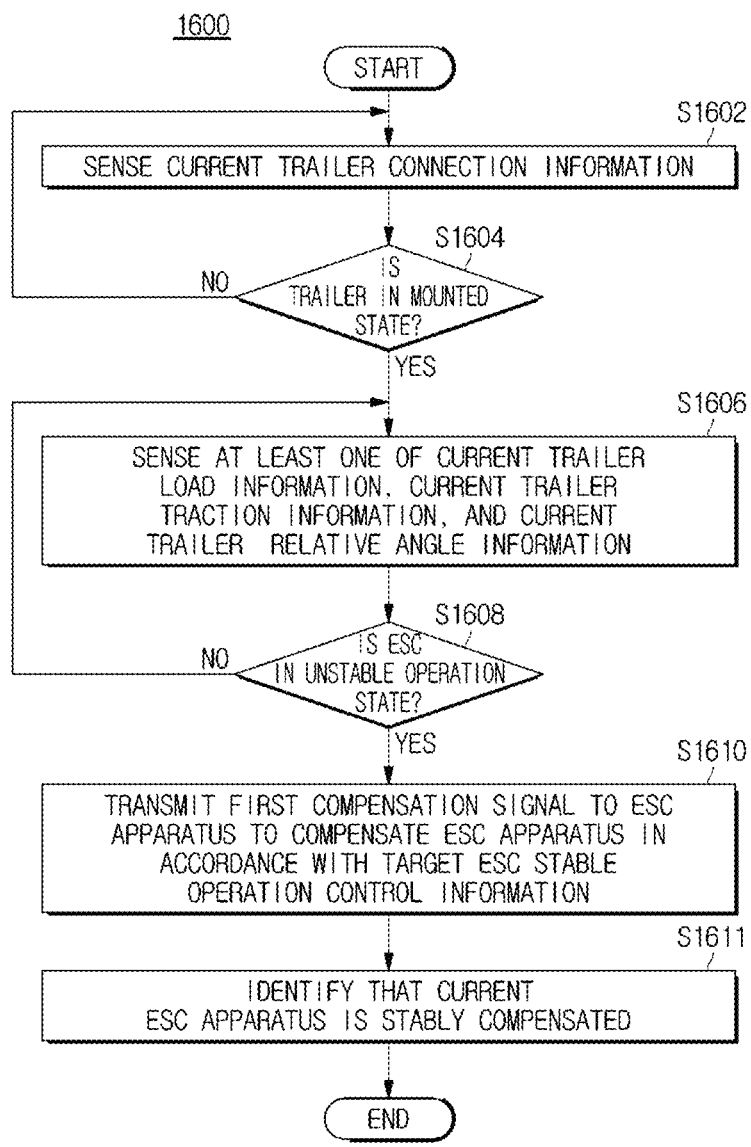
FIG. 16 is a flowchart illustrating another example of a vehicle control method for a vehicle control apparatus according to an embodiment of the present disclosure.

FIG. 15 is a flowchart illustrating another example of a vehicle control method for a vehicle control apparatus according to an embodiment of the present disclosure, and FIG. 16 is a flowchart illustrating another example of a vehicle control method for a vehicle control apparatus according to an embodiment of the present disclosure.

Figure 17:
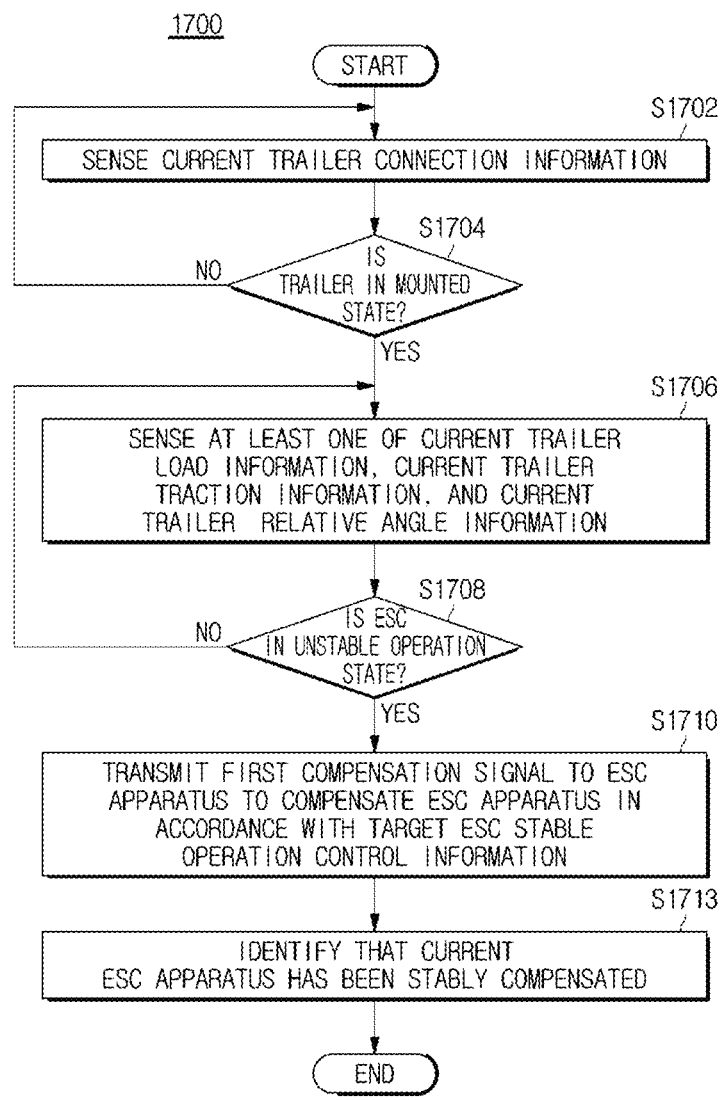
FIG. 17 is a flowchart illustrating another example of a vehicle control method for a vehicle control apparatus according to an embodiment of the present disclosure.

FIG. 17 is a flowchart illustrating another example of a vehicle control method for a vehicle control apparatus according to an embodiment of the present disclosure.

Referring to FIGS. 15 to 17, vehicle control methods (1500 to 1700) of the vehicle control apparatus 1400 (FIG. 14) according to an embodiment of the present disclosure includes first sensing steps (S1502 to S1702), first determination steps (S1504 to S1704), second sensing steps (S1506 to S1706), second determination steps (S1508 to S1708), and first compensation steps (S1510 to S1710), respectively, in the same manner as the vehicle control method 1000 (FIG. 10) of the vehicle control apparatus 100 (FIG. 2).

The functions of the respective steps and the organic connection relation between the steps of the vehicle control methods 1500 to 1700 of the vehicle control apparatus 1400 (FIG. 14) according to an embodiment of the present disclosure are the same as those of the vehicle control method 1000 (FIG. 10) of the vehicle control apparatus 100 (FIG. 2), and thus additional descriptions thereof will be omitted.

The vehicle control methods 1500 to 1700 of the vehicle control apparatus 1400 (FIG. 14) according to an embodiment of the present disclosure may further include a first identification step (S1509), a second identification step (S1611), and a third identification step (S1713).

The first identification step (S1509) may be performed after the second determination step (S1508) and before the first compensation step (S1510).

As another example, the first identification step (S1509) may be performed in synchronization with the first compensation step (S1510), though not shown.

In the first identification step (S1509), when it is determined that the ESC is in the unstable operation state by the determination unit (1404 of FIG. 14), the identification unit 1408 (FIG. 14) may identify that the current ESC apparatus (30 of FIG. 14) operates unstably according to the control of the control unit 1406 (FIG. 14).

The second identification step (S1611) may be performed after the first compensation step (S1610).

As another example, the second identification step (S1611) may be performed in synchronization with the first compensation step (S1610), though not shown.

In the second identification step (S1611), when the ESC apparatus 30 (FIG. 14) is compensated by the control unit 1406 (FIG. 14) in accordance with the target ESC stable operation control information, the identification unit 1408 (FIG. 14) may identify that the current ESC apparatus (30 of FIG. 14) is stably compensated according to the control of the control unit 1406 (FIG. 14).

The third identification step (S1713) may be performed after the first compensation step (S1710).

In the third identification step (S1713), when the first compensation completion signal output from the ESC apparatus 30 (FIG. 14) is received in the control unit 1406 (FIG. 14), the identification unit 1408 (FIG. 14) may identify that the current ESC apparatus 30 (FIG. 14) has been stably compensated according to the control of the control unit 1406 (FIG. 14).

Figure 18:
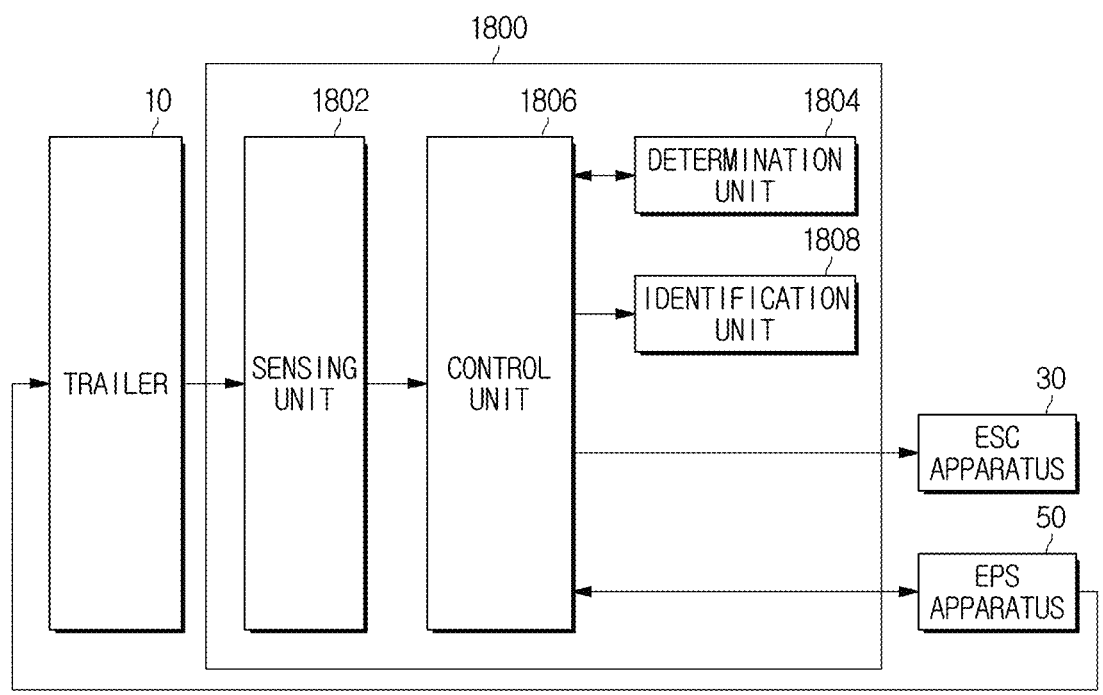
FIG. 18 is a block diagram illustrating another example of a vehicle control apparatus according to an embodiment of the present disclosure.

FIG. 18 is a block diagram illustrating another example of a vehicle control apparatus according to an embodiment of the present disclosure.

Referring to FIG. 18, a vehicle control apparatus 1800 according to an embodiment of the present disclosure includes a sensing unit 1802, a determination unit 1804, and a control unit 1806 in the same manner as the vehicle control apparatus 100 (FIG. 6).

The functions of the respective components and the organic connection relation between the components of the vehicle control device 1800 according to an embodiment of the present disclosure are the same as those of the vehicle control apparatus 100 (FIG. 6), and thus additional descriptions thereof will be omitted.

The vehicle control apparatus 1800 according to an embodiment of the present disclosure may further include an identification unit 1808.

That is, when it is determined that the behavior of the trailer is in the unstable operation state by the determination unit 1804, the identification unit 1808 may identify that the behavior of the current trailer 10 is unstably operated according to the control of the control unit 1806.

Further, when the EPS apparatus 50 is compensated by the control unit 1806 in accordance with the target EPS stable operation control information, the identification unit 1808 may identify that the behavior of the current trailer 10 is stably operated according to the control of the control unit 1806.

Further, when a second compensation completion signal from the EPS apparatus 50 is received in the control unit 1806, the identification unit 1808 may identify that the behavior of the current trailer 10 has been stably compensated according to the control of the control unit 1806.

As an example, although not shown, the identification unit 1808, by including at least one of a warning device (not shown), a speaker (not shown), and a light emitting member (not shown) which are provided so that a driver can identify the information or state of the vehicle, may identify that the behavior of the current trailer 10 is unstably operated, identify that the behavior of the current trailer 10 is stabilized, and identify that the behavior of the current trailer 10 has been stably compensated, through at least one operation of the warning operation of the warning device, the voice operation of the speaker, and the light emitting operation of the light emitting member.

Further, although not shown, the identification unit 1808, by including at least one of an HMI (Human Machine Interface) module (not shown) and a HUD (Head-Up Display) module (not shown) installed as a user interface and a machine so that a driver can grasp the information or status of the vehicle, may identify that the behavior of the current trailer 10 is unstably operated, identify that the behavior of the current trailer 10 is stabilized, and identify that the behavior of the current trailer 10 has been stably compensated, through at least one operation of the HMI message display operation of the HMI module and the HUD message display operation of the HUD module.

Figure 19:
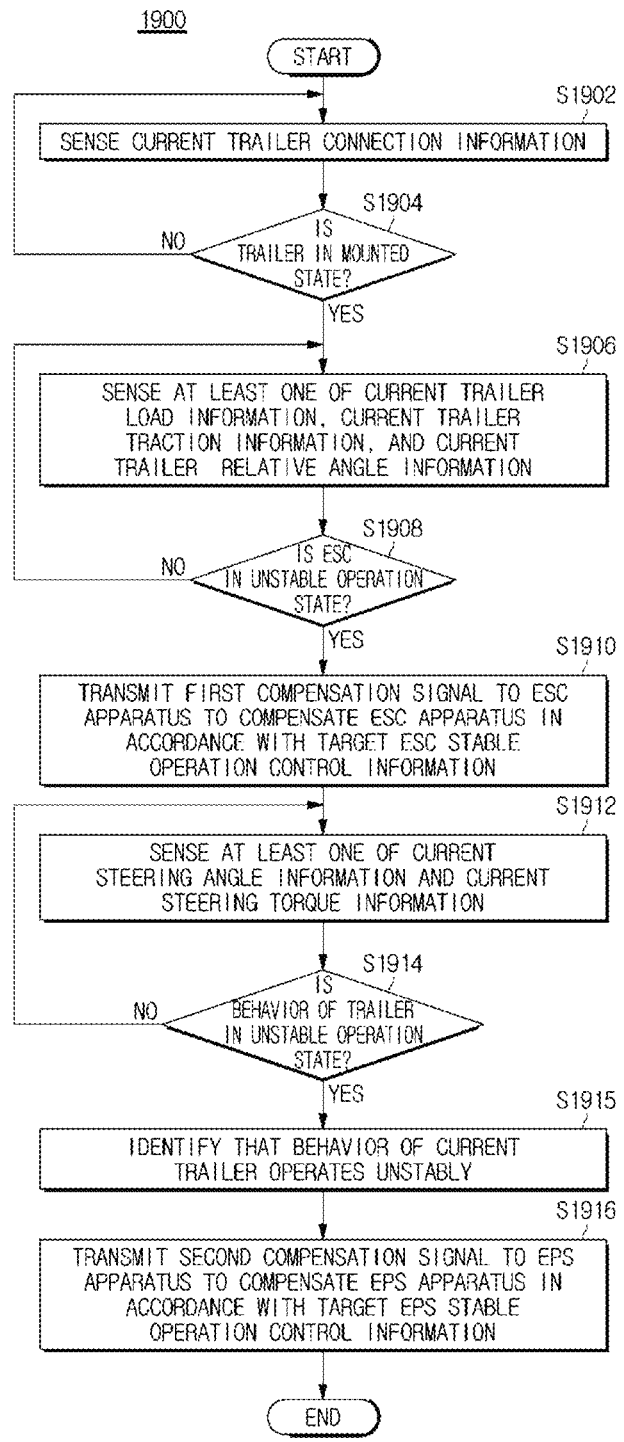
FIG. 19 is a flowchart illustrating another example of a vehicle control method for a vehicle control apparatus according to an embodiment of the present disclosure.
Figure 20:
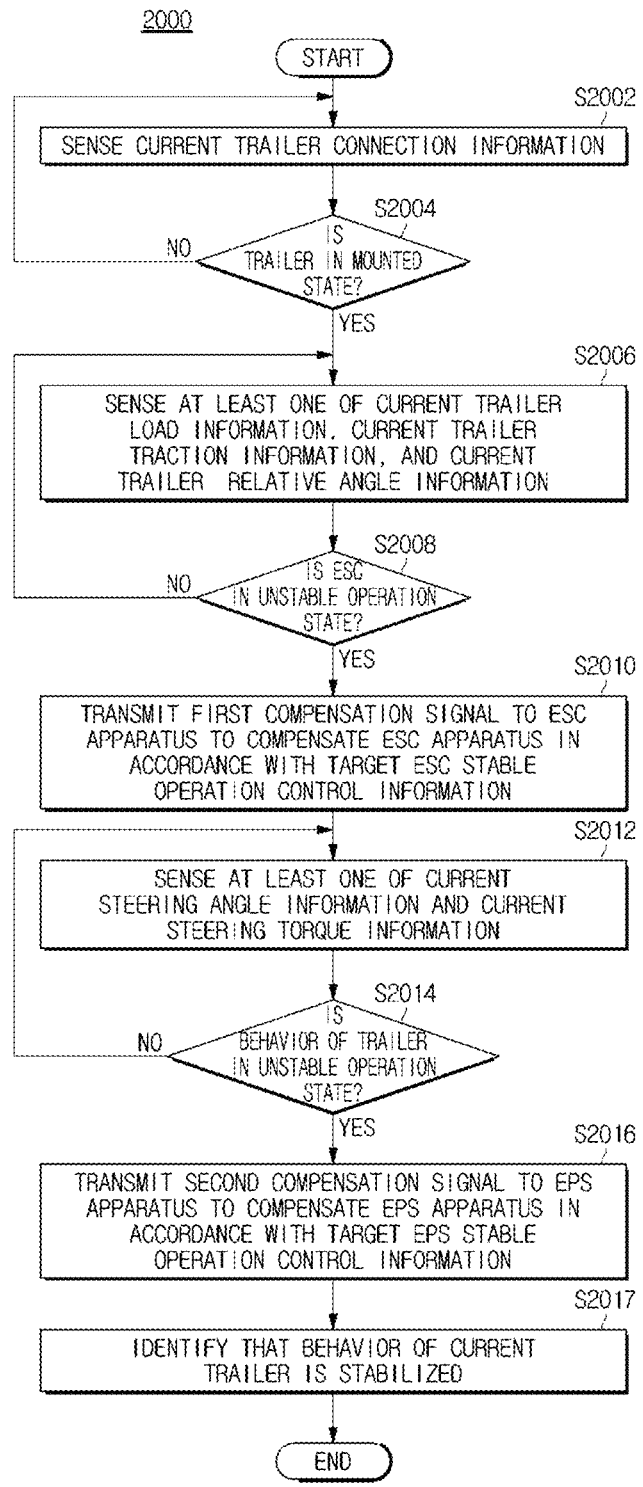
FIG. 20 is a flowchart illustrating another example of a vehicle control method for a vehicle control apparatus according to an embodiment of the present disclosure.

FIG. 19 is a flowchart illustrating another example of a vehicle control method for a vehicle control apparatus according to an embodiment of the present disclosure, and FIG. 20 is a flowchart illustrating another example of a vehicle control method for a vehicle control apparatus according to an embodiment of the present disclosure.

Figure 21:
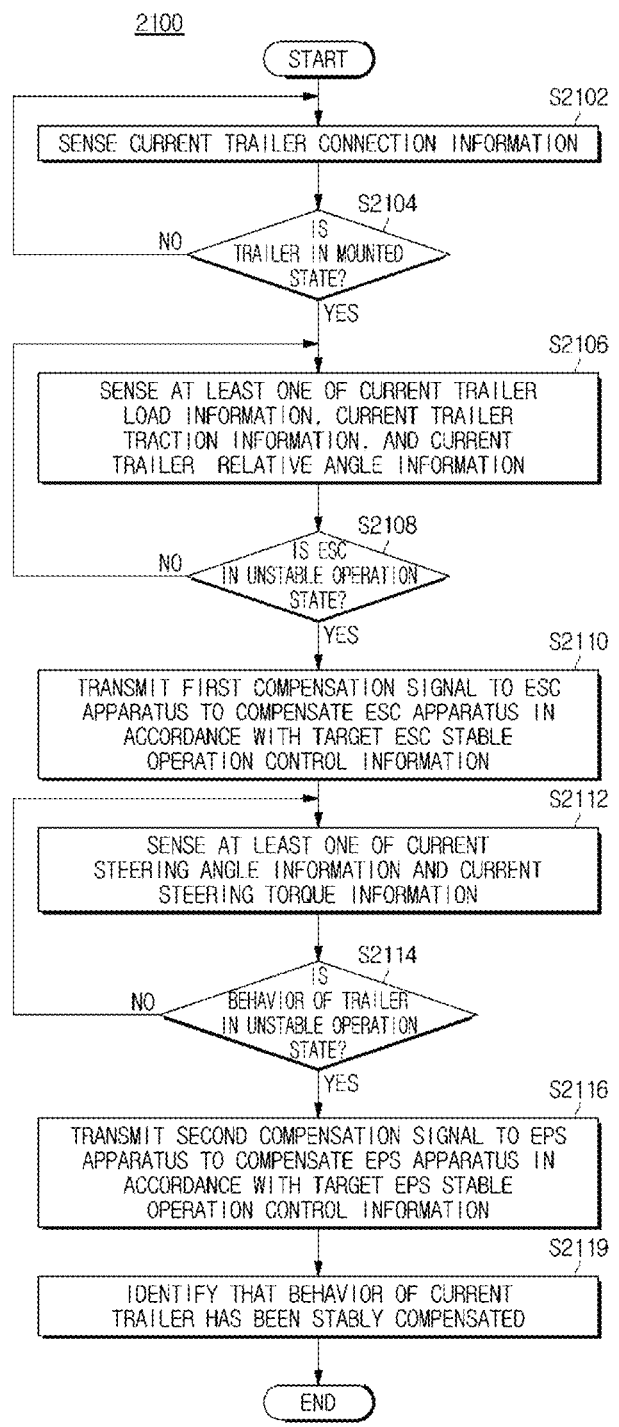
FIG. 21 is a flowchart illustrating another example of a vehicle control method for a vehicle control apparatus according to an embodiment of the present disclosure.

FIG. 21 is a flowchart illustrating another example of a vehicle control method for a vehicle control apparatus according to an embodiment of the present disclosure.

Referring to FIGS. 19 to 21, vehicle control methods 1900 to 2100 of the vehicle control apparatus 1800 (FIG. 18) according to an embodiment of the present disclosure includes first sensing steps (S1902 to S2102), first determination steps (S1904 to S2104), second sensing steps (S1906 to S2106), second determination steps (S1908 to S2108), first compensation steps (S1910 to S2110), third sensing steps (S1912 to S2112), third determination steps (S1914 to S2114), and second compensation steps (S1916 to S2116), respectively, in the same manner as the vehicle control method 1000 (FIG. 10) of the vehicle control apparatus 100 (FIG. 6).

The functions of the respective steps and the organic connection relation between the steps of the vehicle control methods 1900 to 2100 of the vehicle control apparatus 1800 (FIG. 18) according to an embodiment of the present disclosure are the same as those of the vehicle control method 1200 (FIG. 12) of the vehicle control apparatus 100 (FIG. 6), and thus additional descriptions thereof will be omitted.

The vehicle control methods 1900 to 2100 of the vehicle control apparatus 1800 (FIG. 18) according to an embodiment of the present disclosure may further include a fourth identification step (S1915), a fifth identification step (S2017), and a sixth identification step (S2119).

The fourth identification step (S1915) may be performed after the third determination step (S1914) and before the second compensation step (S1916).

As another example, the fourth identification step (S1915) may be performed in synchronization with the second compensation step (S1916), though not shown.

In the fourth identification step (S1915), when it is determined that the behavior of the trailer is in the unstable operation state by the determination unit 1804 (FIG. 18), the identification unit 1808 (FIG. 18) may identify that the behavior of the trailer 10 (FIG. 18) is unstably operated according to the control of the control unit 1806 (FIG. 18).

The fifth identification step (S2017) may be performed after the second compensation step (S2016).

As another example, the fifth identification step (S2017) may be performed in synchronization with the second compensation step (S2016), though not shown.

In the fifth identification step (S2017), when the EPS apparatus 50 (FIG. 18) is compensated by the control unit 1806 (FIG. 18) in accordance with the target EPS stable operation control information, the identification unit 1808 (FIG. 18) may identify that the behavior of the current trailer (10 of FIG. 18) is stabilized according to the control of the control unit 1806 (FIG. 18).

The sixth identification step (S2119) may be performed after the second compensation step (S2116).

In the sixth identification step (S2119), when the second compensation completion signal output from the EPS apparatus 50 (FIG. 18) is received in the control unit 1806 (FIG. 18), the identification unit 1808 (FIG. 18) may identify that the behavior of the current trailer 10 (FIG. 18) has been stably compensated according to the control of the control unit 1806 (FIG. 18).

In the vehicle control apparatuses 100, 1400, and 1800 according to the embodiments of the present disclosure, although the determination units 104, 1404, and 1804 and the control units 106, 1406, and 1806 are described as being separated from each other in order to clearly explain the features of this disclosure, the determination units 104, 1404, and 1804 and the control units 106, 1406, and 1806 may be an ECU (Electronic Control Unit) (not shown) or an MCU (Micro Control Unit) (not shown) for controlling and determining the overall operation of the vehicle.

Further, the determination units 104, 1404, and 1804 and the vehicle control units 106, 1406, and 1806 are not limited thereto, and may be any control means and determination means capable of controlling and determining the overall operation of the vehicle.

As described above, the vehicle control apparatuses 100, 1400, and 1800 and the vehicle control methods 1000 to 1300, 1500 to 1700, and 1900 to 2100 according to the embodiments of the present disclosure include the sensing units 102, 1402, and 1802, the determination units 104, 1404, and 1804, and the control units 106, 1406, and 1806, and perform the first sensing steps (S1002 to S1302, S1502 to S1702, and S1902 to S2102), the first determination steps (S1004 to S1304, S1504 to S1704, and S1904 to S2104), the second sensing steps (S1006 to S1306, S1506 to S1706, and S1906 to S2106), the second determination steps (S1008 to S1308, S1508 to S1708, and S1908 to S2108), and the first compensation steps (S1010 to S1310, S1510 to S1710, and S1910 to S2110).

Accordingly, the vehicle control apparatuses 100, 1400, and 1800 and the vehicle control methods 1000 to 1300, 1500 to 1700, and 1900 to 2100 according to the embodiments of the present disclosure may transmit a first compensation signal to the ESC apparatus 30 from the respective control units 106, 1406, and 1806 to compensate the ESC apparatus 30 in accordance with the set target ESC stable operation control information in order to operate the ESC apparatus 30 in a stable operation state according to at least one of the current trailer load information, current trailer traction information, and current trailer relative angle information when the ESC is in a unstable operation state.

Accordingly, the vehicle control apparatuses 100, 1400, and 1800 and the vehicle control methods 1000 to 1300, 1500 to 1700, and 1900 to 2100 according to the embodiments of the present disclosure may operate the ESC apparatus 30 stably when the trailer 10 is connected.

Further, the vehicle control apparatuses 100 and 1800 and the vehicle control methods 1200, 1300 and 1900 to 2100 according to the embodiments of the present disclosure may include the sensing units 102 and 1802, the determination units 104 and 1804, and the control units 106 and 1806, and may further perform the third sensing steps (S1212, S1312, and S1912 to S2112), the first determination steps (S1214, S1314, and S1914 to S2114), and the second compensation steps (S1216, S1316, and S1916 to S2116).

Accordingly, the vehicle control apparatuses 100 and 1800 and the vehicle control methods 1200, 1300 and 1900 to 2100 according to the embodiments of the present disclosure may further transmit a second compensation signal to the EPS apparatus 50 from the control units 106 and 1806 to compensate the EPS apparatus 50 in accordance with the set target EPS stable operation control information in order to stabilize the behavior of the trailer 10 by a steering operation of the EPS apparatus 50 according to at least one of the current steering angle information and current steering torque information corresponding to the compensated target ESC stable operation control information when the behavior of the trailer 10 is in an unstable operation state.

Accordingly, the vehicle control apparatuses 100 and 1800 and the vehicle control methods 1200, 1300 and 1900 to 2100 according to the embodiments of the present disclosure may stabilize the behavior of the trailer 10 while stably operating the EPS apparatus 50 when the trailer 10 is connected.

Further, the vehicle control apparatus 1400 and the vehicle control methods 1500 to 1700 according to the embodiments of the present disclosure may include the identification unit 1408 and further perform the first identification step (S1509), the second identification step (S1611), and the third identification step (S1713).

Accordingly, the vehicle control apparatus 1400 and the vehicle control methods 1500 to 1700 according to the embodiments of the present disclosure may identify that the current ESC apparatus 30 is unstably operated, identify that the current ESC apparatus 30 is stably operated, and identify that the current ESC apparatus 30 has been stably compensated.

Accordingly, the vehicle control apparatus 1400 and the vehicle control methods 1500 to 1700 according to the embodiments of the present disclosure may suppress anxiety about the operating state of the current ESC apparatus 30 to improve the reliability of the apparatus because a driver can recognize the operation state of the current ESC apparatus 30.

Further, the vehicle control apparatus 1800 and the vehicle control methods 1900 to 2100 according to the embodiments of the present disclosure may include the identification unit 1808 and further perform the fourth identification step (S1915), the fifth identification step (S2017), and the sixth identification step (S2119).

Accordingly, the vehicle control apparatus 1800 and the vehicle control methods 1900 to 2100 according to the embodiments of the present disclosure may identify that the behavior of the current trailer 10 is unstably operated, identify that the behavior of the current trailer 10 is stabilized, and identify that the behavior of the current trailer 10 has been stably compensated.

Accordingly, the vehicle control apparatus 1800 and the vehicle control methods 1900 to 2100 according to the embodiments of the present disclosure may suppress anxiety about the behavior state of the current trailer 10 to improve the reliability of the apparatus because a driver can recognize the behavior state of the current trailer 10.

As is apparent from the above, the vehicle control apparatus and the control method thereof according to an embodiment of the present disclosure can stably operate the ESC apparatus when the trailer is connected.

The vehicle control apparatus and the control method thereof according to an embodiment of the present disclosure can stabilize the behavior of the trailer while stably operating the EPS apparatus when the trailer is connected.

The vehicle control apparatus and the control method thereof according to an embodiment of the present disclosure can suppress anxiety about the operating state of the current ESC apparatus to improve the reliability of the apparatus.

The vehicle control apparatus and the control method thereof according to an embodiment of the present disclosure can suppress anxiety about the behavior state of the current trailer to improve the reliability of the apparatus.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle control apparatus comprising:
a sensor configured to sense at least one of current trailer connection information, current trailer load information, current trailer traction information, and current trailer relative angle information;
a determination unit configured to determine whether a trailer is in a mounted state by using the sensed current trailer connection information, and determine whether an ESC (Electronic Stability Control) is in an unstable operation state by using at least one of the sensed current trailer load information, current trailer traction information, and current trailer relative angle information when the trailer is in the mounted state; and
a control unit configured to transmit a first compensation signal to an ESC apparatus to compensate the ESC apparatus in accordance with the set target ESC stable operation control information to operate the ESC apparatus in a stable operation state according to at least one of the sensed current trailer load information, current trailer traction information, and current trailer relative angle information when the ESC is in the unstable operation state.

2. The vehicle control apparatus according to claim 1, wherein the sensor is configured to sense at least one of current vehicle speed information, current wheel speed information, current steering angle information, and current YAW/G information when the trailer is in the mounted state;
the determination unit is configured to determine whether the ESC is in an unstable operation state by further using at least one of the sensed current vehicle speed information, current wheel speed information, current steering angle information, and current YAW/G information; and
the control unit is configured to transmit the first compensation signal to the ESC apparatus to compensate the ESC apparatus in accordance with the set target ESC stable operation control information to operate the ESC apparatus in a stable operation state according to at least one of the sensed current vehicle speed information, current wheel speed information, current steering angle information, current YAW/G information, current trailer connection information, current trailer load information, current trailer traction information, and current trailer relative angle information when the ESC is in the unstable operation state.

3. The vehicle control apparatus according to claim 1, wherein the sensor is configured to at least one of current steering angle information and current steering torque information when a first compensation completion signal is received from the ESC apparatus;
the determination unit is configured to determine whether the behavior of the trailer is in an unstable operation state by further using at least one of the sensed current steering angle information and the current steering torque information; and
the control unit is configured to transmit a second compensation signal to an EPS apparatus to compensate the EPS apparatus in accordance with the set target EPS stable operation control information to stabilize the behavior of the trailer by a steering operation of the EPS apparatus according to at least one of the sensed current steering angle information and current steering torque information corresponding to the compensated target ESC stable operation control information when the behavior of the trailer is in the unstable operation state.

4. The vehicle control apparatus according to claim 1, further comprising an identification unit configured to identify that the current ESC apparatus operates unstably when the ESC is in the unstable operation state.

5. The vehicle control apparatus according to claim 1, further comprising an identification unit configured to identify that the current ESC apparatus is stably compensated when compensating the ESC apparatus in accordance with the target ESC stable operation control information.

6. The vehicle control apparatus according to claim 1, further comprising an identification unit configured to identify that the current ESC apparatus has been stably compensated when a first compensation completion signal is received from the ESC apparatus.

7. The vehicle control apparatus according to claim 3, further comprising an identification unit configured to identify that the behavior of the current trailer is unstably operated when the behavior of the trailer is in the unstable operation state.

8. The vehicle control apparatus according to claim 3, further comprising an identification unit configured to identify that the behavior of the current trailer is stabilized when the EPS apparatus is compensated in accordance with the target EPS stable operation control information.

9. The vehicle control apparatus according to claim 3, further comprising an identification unit configured to identify that the behavior of the current trailer has been stably compensated when a second compensation completion signal is received from the EPS apparatus.

10. A vehicle control method comprising:
sensing current trailer connection information;
determining whether a trailer is in a mounted state by using the sensed current trailer connection information;
sensing at least one of current trailer load information, current trailer traction information, and current trailer relative angle information when the trailer is in the mounted state;
determining whether an ESC (Electronic Stability Control) is in an unstable operation state by using at least one of the sensed current trailer load information, current trailer traction information, and current trailer relative angle information; and
transmitting a first compensation signal to an ESC apparatus to compensate the ESC apparatus in accordance with the set target ESC stable operation control information to operate the ESC apparatus in a stable operation state according to at least one of the sensed current trailer load information, current trailer traction information, and current trailer relative angle information when the ESC is in the unstable operation state.

11. The vehicle control method according to claim 10, further comprising:
sensing at least one of current vehicle speed information, current wheel speed information, current steering angle information, and current YAW/G information when the trailer is in the mounted state;
determining whether the ESC is in an unstable operation state by further using at least one of the sensed current vehicle speed information, current wheel speed information, current steering angle information, and current YAW/G information; and transmitting the first compensation signal to the ESC apparatus to compensate the ESC apparatus in accordance with the set target ESC stable operation control information to operate the ESC apparatus in a stable operation state according to at least one of the sensed current vehicle speed information, current wheel speed information, current steering angle information, current YAW/G information, current trailer connection information, current trailer load information, current trailer traction information, and current trailer relative angle information when the ESC is in the unstable operation state.

12. The vehicle control method according to claim 10, further comprising:

sensing at least one of current steering angle information and current steering torque information when a first compensation completion signal is received from the ESC apparatus;

determining whether the behavior of the trailer is in an unstable operation state by further using at least one of the sensed current steering angle information and the current steering torque information; and transmitting a second compensation signal to an EPS apparatus to compensate the EPS apparatus in accordance with the set target EPS stable operation control information to stabilize the behavior of the trailer by a steering operation of the EPS apparatus according to at least one of the sensed current steering angle information and current steering torque information corresponding to the compensated target ESC stable operation control information when the behavior of the trailer is in the unstable operation state.

13. The vehicle control method according to claim 10, further comprising identifying that the current ESC apparatus operates unstably when the ESC is in the unstable operation state.

14. The vehicle control method according to claim 10, further comprising identifying that the current ESC apparatus is stably compensated when compensating the ESC apparatus in accordance with the target ESC stable operation control information.

15. The vehicle control method according to claim 10, further comprising identifying that the current ESC apparatus has been stably compensated when a first compensation completion signal is received from the ESC apparatus.

16. The vehicle control method according to claim 12, further comprising identifying that the behavior of the current trailer is unstably operated when the behavior of the trailer is in the unstable operation state.

17. The vehicle control method according to claim 12, further comprising identifying that the behavior of the current trailer is stabilized when the EPS apparatus is compensated in accordance with the target EPS stable operation control information.

18. The vehicle control method according to claim 12, further comprising identifying that the behavior of the current trailer has been stably compensated when a second compensation completion signal is received from the EPS apparatus.

* * * * *